(12) United States Patent
Xu et al.

(10) Patent No.: US 9,201,255 B2
(45) Date of Patent: Dec. 1, 2015

(54) APPARATUS, METHODS AND COMPUTER PROGRAMS FOR CONFIGURING OUTPUT OF A DISPLAY

(75) Inventors: Liangfeng Xu, Beijing (CN); Huaya Cao, Beijing (CN); Kongqiao Wang, Beijing (CN); Ziqiang Huang, Sichuan (CN); Jinbi Leng, Deyang (CN); Chenguang Cai, Beijing (CN)

(73) Assignee: Nokia Technologies Oy, Espoo (FI)

( * ) Notice: Subject to any disclaimer, the term of this patent is extended or adjusted under 35 U.S.C. 154(b) by 453 days.

(21) Appl. No.: 13/635,792

(22) PCT Filed: Mar. 19, 2010

(86) PCT No.: PCT/CN2010/000341
§ 371 (c)(1),
(2), (4) Date: Nov. 7, 2012

(87) PCT Pub. No.: WO2011/113180
PCT Pub. Date: Sep. 22, 2011

(65) Prior Publication Data
US 2013/0057790 A1    Mar. 7, 2013

(51) Int. Cl.
*G02F 1/133* (2006.01)
*G02F 1/13* (2006.01)
*G02F 1/1347* (2006.01)

(52) U.S. Cl.
CPC .......... *G02F 1/13306* (2013.01); *G02F 1/1323* (2013.01); *G02F 1/1347* (2013.01)

(58) Field of Classification Search
CPC ............ G02F 1/13306; G02F 1/13471; G02F 1/1347; G02F 1/1323; G09G 3/3611; G09G 3/003; G09G 2320/068; G09G 2320/028; G09G 2300/023
See application file for complete search history.

(56) References Cited

U.S. PATENT DOCUMENTS

| 4,812,709 A | 3/1989 | Dudasik ........................ 313/478 |
| 5,617,228 A | 4/1997 | Watanabe et al. ................ 349/19 |
| 6,049,424 A * | 4/2000 | Hamagishi ..................... 359/463 |
| 7,453,429 B2 | 11/2008 | Chang et al. ..................... 345/89 |
| 2002/0030887 A1 | 3/2002 | Hamagishi et al. ........... 359/463 |
| 2005/0073629 A1 | 4/2005 | Jou et al. ......................... 349/75 |

(Continued)

FOREIGN PATENT DOCUMENTS

| CN | 1632659 A | 6/2005 |
| CN | 1866096 A | 11/2006 |

(Continued)

*Primary Examiner* — Michael Caley
*Assistant Examiner* — Jia Pan
(74) *Attorney, Agent, or Firm* — Harrington & Smith

(57) ABSTRACT

Apparatus including a first liquid crystal layer configured to receive at least a portion of an image and to provide the portion of the image across an angular viewing range; first substantially transparent electrodes positioned adjacent the first liquid crystal layer, the first electrodes being configured to have at least a first configuration in which a first subset of the electrodes provide electric fields across the first liquid crystal layer to form first transparent regions and first opaque regions in the first liquid crystal layer to provide a first angular viewing range, and a second configuration in which a second subset of the electrodes provide electric fields across the first liquid crystal layer to form second different transparent regions and second different opaque regions in the first liquid crystal layer to provide a second angular viewing range, having a different angular viewing range to the first angular viewing range.

19 Claims, 17 Drawing Sheets

(56) References Cited

U.S. PATENT DOCUMENTS

| | | | |
|---|---|---|---|
| 2005/0286000 A1* | 12/2005 | Tsai et al. | 349/119 |
| 2006/0109224 A1* | 5/2006 | Chang et al. | 345/89 |
| 2006/0145976 A1* | 7/2006 | Tsai et al. | 345/87 |
| 2006/0158590 A1 | 7/2006 | Matsushima | 349/117 |
| 2006/0262057 A1 | 11/2006 | Sumiyoshi | 345/87 |
| 2007/0030240 A1 | 2/2007 | Sumiyoshi et al. | 345/102 |
| 2007/0040780 A1 | 2/2007 | Gass et al. | 345/87 |
| 2007/0171193 A1* | 7/2007 | Nakamura | 345/156 |
| 2008/0117364 A1* | 5/2008 | Matsushima | 349/96 |
| 2009/0096954 A1* | 4/2009 | Sakai et al. | 349/61 |

FOREIGN PATENT DOCUMENTS

| | | |
|---|---|---|
| EP | 0 043 603 | 1/1982 |
| EP | 0 088 126 | 3/1983 |
| EP | 0 540 137 A1 | 5/1993 |
| EP | 0 833 183 A1 | 4/1998 |
| EP | 1 682 932 | 5/2005 |
| EP | 1 589 366 A2 | 10/2005 |
| EP | 1 994 767 | 2/2007 |
| JP | 6-59287 | 3/1994 |
| JP | 9-105958 | 4/1997 |
| JP | 10-197844 | 7/1998 |
| JP | 2000-111895 | 4/2000 |
| JP | 2004-133334 | 4/2004 |
| JP | 2007-33813 | 2/2007 |
| WO | WO 98/35266 | 8/1998 |
| WO | WO 2007/094390 A1 | 8/2007 |
| WO | WO 2007/117323 A2 | 10/2007 |

* cited by examiner

APPARATUS, METHODS AND COMPUTER PROGRAMS FOR CONFIGURING OUTPUT OF A DISPLAY

FIELD OF THE INVENTION

Embodiments of the present invention relate to apparatus, methods and computer programs for configuring output of a display. In particular, they relate to apparatus, methods and computer programs in a mobile cellular telephone.

BACKGROUND TO THE INVENTION

Apparatus such as mobile cellular telephones usually include a display for displaying information to a user of apparatus. Such apparatus have become relatively sophisticated in recent years and may enable a user to access the internet and review private information such as bank account details. However, since such apparatus may be used in public places (in a train carriage for example), there is a danger that other people may view private information displayed on the display.

It would therefore be desirable to provide an alternative apparatus.

BRIEF DESCRIPTION OF VARIOUS EMBODIMENTS OF THE INVENTION

According to various, but not necessarily all, embodiment of the invention there is provided apparatus comprising: a first liquid crystal layer configured to receive at least a portion of an image and to provide the portion of the image across an angular viewing range; a first plurality of substantially transparent electrodes positioned adjacent the first liquid crystal layer, the first plurality of electrodes being configured to have at least a first configuration in which a first subset of electrodes provide electric fields across the first liquid crystal layer to form a first plurality of transparent regions and a first plurality of opaque regions in the first liquid crystal layer to provide a first angular viewing range, and a second configuration in which a second subset of electrodes provide electric fields across the first liquid crystal layer to form a second plurality of different transparent regions and a second plurality of different opaque regions in the first liquid crystal layer to provide a second angular viewing range, having a different angular viewing range to the first angular viewing range.

The apparatus may be for configuring output of a display.

The first plurality of electrodes may be configured to have more than two configurations. Each configuration may provide a different angular viewing range.

The first liquid crystal layer may be configured to receive at least a portion of an image from a display comprising a plurality of pixels. The first plurality of electrodes may be substantially elongate and have a length and a width. The width of the first plurality of electrodes may be less than the width of a pixel of the display.

The apparatus may further comprise a controller configured to control the first plurality of electrodes to switch between at least the first configuration and the second configuration.

The controller may be configured to receive a control signal from a user input device including an indication of an angular viewing range, and may be configured to control the first plurality of electrodes to enter a configuration to provide the indicated angular viewing range.

The first plurality of transparent electrodes may be configured to have at least a third configuration in which a third subset of electrodes provide electric fields across the first liquid crystal layer to form a third plurality of transparent regions and a third plurality of opaque regions in the first liquid crystal layer to provide an angular viewing range oriented in a first direction, and a fourth configuration in which a fourth subset of electrodes provide electric fields across the first liquid crystal layer to form a fourth plurality of different transparent regions and a fourth plurality of different opaque regions in the first liquid crystal layer to provide an angular viewing range oriented in a second direction, the first direction being different to the second direction.

The apparatus may further comprise a controller configured to control the first plurality of electrodes to switch between at least the third configuration and the fourth configuration.

The controller may be configured to control a display to provide at least a portion of a first image to the first liquid crystal layer when the first plurality of electrodes are in the third configuration, and to provide at least a portion of a second different image to the first liquid crystal layer when the first plurality of electrodes are in the fourth configuration.

The apparatus may further comprise a detector configured to detect the position of a user's eyes relative to the apparatus. The controller may be configured to process data from the detector to control the first plurality of electrodes so that the first liquid crystal layer provides an angular viewing range oriented towards a first eye of the user for at least a portion of a first image and provides an angular viewing range oriented towards a second different eye of the user for at least a portion of a second image.

The controller may be configured to receive data including an indication that two dimensional display or three dimensional display is to be provided from a display, and may be configured to control the first plurality of transparent electrodes to enter into at least the first configuration or the second configuration to provide a two dimensional display or to alternate between at least two configurations each having an angular viewing range with a different orientation to provide a three dimensional display.

The apparatus may further comprise a second liquid crystal layer positioned adjacent the first liquid crystal layer, and a second plurality of transparent electrodes positioned adjacent the second liquid crystal layer. The second plurality of electrodes may be configured to have different configurations in which different subsets of electrodes provide electric fields across the second liquid crystal layer to form different pluralities of transparent regions and different pluralities of opaque regions in the second liquid crystal layer.

The apparatus may further comprise a third liquid crystal layer positioned adjacent the first liquid crystal layer, and a third plurality of transparent electrodes positioned adjacent the third liquid crystal layer. The third plurality of electrodes may be configured to have different configurations in which different subsets of electrodes provide electric fields across the third liquid crystal layer to form different pluralities of transparent regions and different pluralities of opaque regions in the third liquid crystal layer.

The apparatus may be configured to adhere to a display of a device.

According to various, but not necessarily all, embodiments of the invention there is provided a device comprising a display and an apparatus as described in any of the preceding paragraphs.

According to various, but not necessarily all, embodiments of the invention there is provided a device comprising a display and an apparatus as described in any of the preceding paragraphs integrated into the display.

According to various, but not necessarily all, embodiments of the invention there is provided a mobile cellular telephone comprising an apparatus as described in any of the preceding paragraphs.

According to various, but not necessarily all, embodiments of the invention there is provided a method comprising: configuring a first plurality of transparent electrodes, positioned adjacent a first liquid crystal layer, the first liquid crystal layer configured to receive at least a portion of an image and to provide the portion of the image across an angular viewing range, to enter a first configuration in which a first subset of electrodes provide electric fields across the first liquid crystal layer to form a first plurality of transparent regions and a first plurality of opaque regions in the first liquid crystal layer to provide a first angular viewing range; and configuring the first plurality of transparent electrodes to enter a second configuration in which a second subset of electrodes provide electric fields across the first liquid crystal layer to form a second plurality of different transparent regions and a second plurality of different opaque regions in the first liquid crystal layer to provide a second angular viewing range, having a different angular viewing range to the first angular viewing range.

The method may further comprise configuring the first plurality of electrodes to enter more than two configurations, each configuration providing a different angular viewing range.

The first liquid crystal layer may be configured to receive at least a portion of an image from a display comprising a plurality of pixels. The first plurality of electrodes may be substantially elongate and have a length and a width. The width of the first plurality of electrodes may be less than the width of a pixel of the display.

The method may further comprise receiving a control signal including an indication of an angular viewing range, and controlling the first plurality of electrodes to enter a configuration to provide the indicated angular viewing range.

The method may further comprise configuring the first plurality of transparent electrodes to enter a third configuration in which a third subset of electrodes provide electric fields across the first liquid crystal layer to form a third plurality of transparent regions and a third plurality of opaque regions in the first liquid crystal layer to provide an angular viewing range oriented in a first direction, and configuring the first plurality of transparent electrodes to enter a fourth configuration in which a fourth subset of electrodes provide electric fields across the first liquid crystal layer to form a fourth plurality of different transparent regions and a fourth plurality of different opaque regions in the first liquid crystal layer to provide an angular viewing range oriented in a second direction, the first direction being different to the second direction.

The method may further comprise controlling a display to provide at least a portion of a first image to the first liquid crystal layer when the first plurality of electrodes are in the third configuration, and to provide at least a portion of a second different image to the first liquid crystal layer when the first plurality of electrodes are in the fourth configuration.

The method may further comprise detecting the position of a user's eyes relative to the apparatus, and controlling the first plurality of electrodes to enter a configuration so that the first liquid crystal layer provides an angular viewing range oriented towards a first eye of the user for at least a portion of a first image and provides an angular viewing range oriented towards a second different eye of the user for at least a portion of a second image.

The method may further comprise receiving an indication that two dimensional display or three dimensional display is to be provided from a display, and controlling the first plurality of transparent electrodes to enter into at least the first configuration or the second configuration to provide a two dimensional display or to alternate between at least two configurations each having an angular viewing range with a different orientation to provide a three dimensional display.

The method may further comprise configuring a second plurality of transparent electrodes positioned adjacent a second liquid crystal layer, the second liquid crystal layer positioned adjacent the first liquid crystal layer, to have different configurations in which different subsets of electrodes provide electric fields across the second liquid crystal layer to form different pluralities of transparent regions and different pluralities of opaque regions in the second liquid crystal layer.

The method may further comprise configuring a third plurality of transparent electrodes positioned adjacent a third liquid crystal layer, the third liquid crystal layer positioned adjacent the first liquid crystal layer, to have different configurations in which different subsets of electrodes provide electric fields across the third liquid crystal layer to form different pluralities of transparent regions and different pluralities of opaque regions in the third liquid crystal layer.

According to various, but not necessarily all, embodiments of the invention there is provided a computer program that, when run on a computer, performs: configuring a first plurality of transparent electrodes, positioned adjacent a first liquid crystal layer, the first liquid crystal layer configured to receive at least a portion of an image and to provide the portion of the image across an angular viewing range, to enter a first configuration in which a first subset of electrodes provide electric fields across the first liquid crystal layer to form a first plurality of transparent regions and a first plurality of opaque regions in the first liquid crystal layer to provide a first angular viewing range; and configuring the first plurality of transparent electrodes to enter a second configuration in which a second subset of electrodes provide electric fields across the first liquid crystal layer to form a second plurality of different transparent regions and a second plurality of different opaque regions in the first liquid crystal layer to provide a second angular viewing range, having a different angular viewing range to the first angular viewing range.

The computer program may, when run on a computer, perform: configuring the first plurality of electrodes to enter more than two configurations, each configuration providing a different angular viewing range.

The computer program may, when run on a computer, performs: configuring the first plurality of transparent electrodes to enter a third configuration in which a third subset of electrodes provide electric fields across the first liquid crystal layer to form a third plurality of transparent regions and a third plurality of opaque regions in the first liquid crystal layer to provide an angular viewing range oriented in a first direction, and configuring the first plurality of transparent electrodes to enter a fourth configuration in which a fourth subset of electrodes provide electric fields across the first liquid crystal layer to form a fourth plurality of different transparent regions and a fourth plurality of different opaque regions in the first liquid crystal layer to provide an angular viewing range oriented in a second direction, the first direction being different to the second direction.

According to various, but not necessarily all, embodiments of the invention there is provided a computer readable storage medium encoded with instructions that, when executed by a processor, perform: configuring a first plurality of transparent electrodes, positioned adjacent a first liquid crystal layer, the first liquid crystal layer configured to receive at least a portion of an image and to provide the portion of the image across an angular viewing range, to enter a first configuration in which a first subset of electrodes provide electric fields across the first liquid crystal layer to form a first plurality of transparent regions and a first plurality of opaque regions in the first liquid crystal layer to provide a first angular viewing range; and configuring the first plurality of transparent electrodes to enter a second configuration in which a second subset of electrodes provide electric fields across the first liquid crystal layer to form a second plurality of different transparent regions and a second plurality of different opaque regions in the first liquid crystal layer to provide a second angular viewing range, having a different angular viewing range to the first angular viewing range.

The computer readable storage medium may be encoded with instructions that, when executed by a processor, perform: configuring the first plurality of electrodes to enter more than two configurations, each configuration providing a different angular viewing range.

The computer readable storage medium may be encoded with instructions that, when executed by a processor, perform: configuring the first plurality of transparent electrodes to enter a third configuration in which a third subset of electrodes provide electric fields across the first liquid crystal layer to form a third plurality of transparent regions and a third plurality of opaque regions in the first liquid crystal layer to provide an angular viewing range oriented in a first direction, and configuring the first plurality of transparent electrodes to enter a fourth configuration in which a fourth subset of electrodes provide electric fields across the first liquid crystal layer to form a fourth plurality of different transparent regions and a fourth plurality of different opaque regions in the first liquid crystal layer to provide an angular viewing range oriented in a second direction, the first direction being different to the second direction.

According to various, but not necessarily all, embodiments of the invention there is provided a computer program that, when run on a computer, performs the method as described in any of the preceding paragraphs.

According to various, but not necessarily all, embodiments of the invention there is provided a computer readable storage medium encoded with instructions that, when executed by a processor, perform the method as described in any of the preceding paragraphs.

According to various, but not necessarily all, embodiments of the invention there is provided apparatus comprising: a first liquid crystal layer; a first plurality of substantially transparent electrodes positioned adjacent the first liquid crystal layer; a second liquid crystal layer; a second plurality of substantially transparent electrodes positioned adjacent the second liquid crystal layer; wherein the first plurality of electrodes and the second plurality of electrodes are configured to have at least a first configuration in which a first subset of electrodes provide electric fields across the first liquid crystal layer and across the second liquid crystal layer to form a first plurality of transparent regions and a first plurality of opaque regions in the first liquid crystal layer and in the second liquid crystal layer to provide a first light output, and a second configuration in which a second subset of electrodes provide electric fields across the first liquid crystal layer and the second liquid crystal layer to form a second plurality of different transparent regions and a second plurality of different opaque regions in at least the second liquid crystal layer to provide a second different light output.

The first light output may have a different angular viewing range to the second light output.

The first light output may be oriented in a different direction to the second light output.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

In the following description, the wording 'connect' and 'couple' and their derivatives mean operationally connected/coupled. It should be appreciated that any number or combination of intervening components can exist (including no intervening components).

Figure 1:
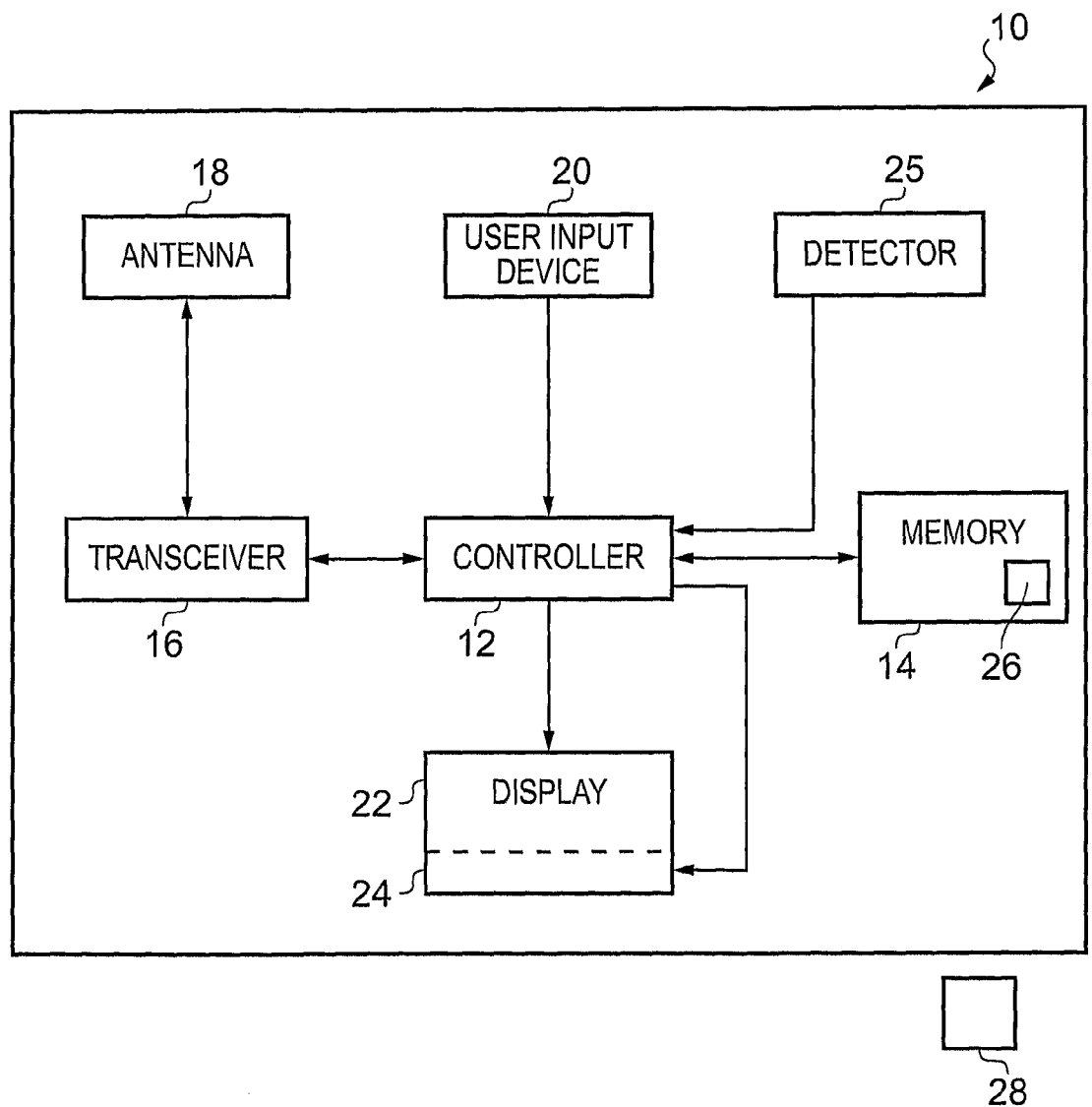
FIG. 1 illustrates a schematic diagram of a device according to various embodiments of the present invention.

FIG. 1 illustrates a schematic diagram of a device 10 according to various embodiments of the invention. The device 10 includes a controller 12, a memory 14, a transceiver 16, one or more antennas 18, a user input device 20, a display 22, an apparatus 24 and a (optional) detector 25. The apparatus 24 is arranged to configure the output of the display and may be referred to as a transmission cell. The apparatus 24 will be explained in detail below with reference to FIGS. 2 to 20.

The device 10 may be any apparatus and may be a portable device (for example, a mobile cellular telephone, a personal digital assistant (PDA), a palmtop computer or a laptop computer), a non-portable device (for example, a desk top computer or an automatic teller machine) or a module for such devices. As used here, 'module' refers to a unit or apparatus that excludes certain parts/components that would be added by an end manufacturer or a user. It should be appreciated that at least some of the features mentioned in the preceding paragraph may or may not be included in devices according to embodiments of the present invention.

The controller 12 may be any suitable processor and may be a microprocessor for example. Implementation of the controller 12 can be in hardware alone (for example, a circuit, a processor and so on), have certain aspects in software including firmware alone or can be a combination of hardware and software (including firmware).

The controller 12 may be implemented using instructions that enable hardware functionality, for example, by using executable computer program instructions in a general-purpose or special-purpose processor that may be stored on a computer readable storage medium (for example, a disk, a memory and so on) to be executed by such a processor.

The controller 12 is configured to read from and write to the memory 14. The controller 12 may also comprise an output interface via which data and/or commands are output by the controller 12 and an input interface via which data and/or commands are input to the controller 12.

The memory 14 may be any suitable memory and may, for example be permanent built-in memory such as flash memory or it may be a removable memory such as a hard disk, secure digital (SD) card or a micro-drive. The memory 14 stores a computer program 26 comprising computer program instructions that control the operation of the device 10 when loaded into the controller 12. The computer program instructions 26 provide the logic and routines that enables the device 10/apparatus 24 to perform the methods illustrated in FIGS. 3, 5, 11, 16, 18 and 20. The processor 12 by reading the memory 14 is able to load and execute the computer program 26.

The computer program may arrive at the device 10 via any suitable delivery mechanism 28. The delivery mechanism 28 may be, for example, a computer-readable storage medium, a computer program product, a memory device, a record medium such as a Compact Disc (CD-ROM), a Digital Versatile Disc (DVD), a Blu-Ray disc, or any article of manufacture that tangibly embodies the computer program 26. The delivery mechanism 28 may be a signal configured to reliably transfer the computer program 26. The device 10 may propagate or transmit the computer program 26 as a computer data signal.

Although the memory 14 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' and so on, or a 'controller', 'computer', 'processor' and so on, should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code and so on should be understood to encompass software for a programmable processor or firmware such as, for example, the programmable content of a hardware device whether instructions for a processor, or configuration settings for a fixed-function device, gate array or programmable logic device and so on.

The transceiver 16 is connected to the antenna 18 and to the processor 12. The processor 12 is configured to provide data to the transceiver 16. The transceiver 16 is configured to encode the data and provide the encoded data to the antenna 18 for transmission. The antenna 18 is configured to transmit the encoded data as a radio signal. The antenna 18 is also configured to receive a radio signal. The transceiver 16 receives the radio signal from the antenna 18 and decodes the radio signal into data. The radio signal may have a frequency within a licensed cellular frequency band (for example, within a Global System for Mobile communications (GSM) frequency band (for example, 900 MHz)).

The user input device 20 (which may for example include one or more keys or a keypad) may be operable by a user to provide control signals to the controller 12. The user input device 20 may enable a user to control some or all aspects of a graphical user interface displayed on the display 22 of the device 10.

The display 22 is configured to receive and display data from the controller 12. The controller 12 may read data from the memory 14 and provide the data to the display 22 for display to a user of the device 10. The display 22 may be any suitable display and may be, for example, a thin film transistor (TFT) display, a liquid crystal display (LCD) or a light emitting diode (LED) display (for example, an organic light emitting diode (OLED) display). The display 22 comprises a plurality of pixels that are arranged in an array having a plurality of rows and columns. For example, where the device 10 is a mobile cellular telephone, the display 22 may have an array of three hundred and sixty pixels by six hundred and forty pixels.

In some embodiments, the user input device 20 may be incorporated into the display to provide a touch screen display (for example, a resistive or a capacitive touch screen display). The display 22 may include one or more sensors (not illustrated) for sensing the application of force by a user and for providing a control signal to the controller 12. The controller 12 may be configured to control the display 22 using control signals received from the one or more sensors.

The apparatus 24 may be integrated into the display 22 during manufacture of the display 22. In other embodiments, the apparatus 24 may be a separate device that may be coupled to the display 22 after the display 22 has been manufactured.

The (optional) detector 25 is configured to detect the position of a user relative to the apparatus 24/device 10. In some embodiments, the detector 25 comprises an imaging unit (for example, a charge coupled device (CCD) camera or a complementary metal oxide semiconductor (CMOS) camera) positioned on the same surface of the device 10 as the display 22. In other embodiments, the detector 25 may additionally or alternatively comprise an audio input device (for example, a microphone array).

Where the detector 25 comprises an imaging unit, the imaging unit may be configured to detect the user's face at predetermined time intervals and the controller 12 may be configured to calculate the orientation and distance of the user's eyes to the device 10. In more detail, the controller 12 or detector 25 may process the output of the imaging unit to determine the local coordinate system of the user's face. For example, the controller 12 may identify the user's two eyes and mouth and form a triangle there between (the line between the user's eyes defines the horizontal axis of the face). The controller 12 may determine the orientation of the user's face from the determined horizontal axis of the user's face and the distance of the user's face from the surface area enclosed by the triangle.

Where the detector 25 comprises an audio input device as described above, the controller 12 may be configured to process signals from the audio input device to detect and calculate the user's orientation and distance to the device 10/apparatus 24.

Figure 2A:
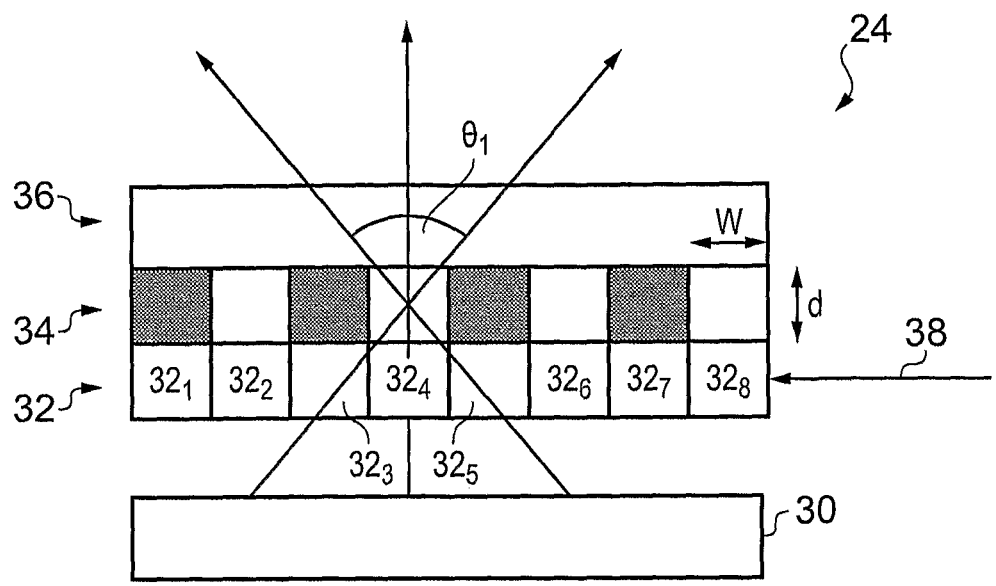
FIG. 2A illustrates a cross sectional schematic diagram of an apparatus having a first angular viewing range according to various embodiments of the present invention.

FIG. 2A illustrates a cross sectional schematic diagram of an apparatus 24 positioned adjacent a pixel 30 of the display 22. The apparatus 24 has a laminate structure and comprises a first plurality of transparent electrodes 32 formed in a layer, a first liquid crystal layer 34 and a transparent electrode 36 formed in a layer. The first plurality of transparent electrodes 32 are positioned adjacent the pixel 30 and the first liquid crystal layer 34 is sandwiched between the first plurality of transparent electrodes 32 and the transparent electrode 36. It should be appreciated that only a portion of the apparatus 24 is illustrated in FIG. 2A for clarity purposes and that the laminate structure of the apparatus 24 is repeated across at least a portion of the display's 22 pixels.

The first plurality of transparent electrodes 32 may comprise any transparent conductive material and may comprise indium-tin-oxide (ITO) for example. In FIG. 2A, eight transparent electrodes are illustrated and are labeled with reference numerals $32_1, 32_2, \ldots, 32_8$. It should be appreciated that more electrodes may be provided if the line width of the electrodes is smaller for example. Each of the first plurality of transparent electrodes 32 has a width w that is less than the width of a pixel 30 of the display 22. In this embodiment, the width of the pixel 30 is eight times greater than the width of a transparent electrode 32. Each of the first plurality of transparent electrodes has a length that is substantially equal to the length of the vertical dimension of the display 22. For example, where the device 10 is a mobile cellular telephone and has a display 22 with a resolution of three hundred and sixty pixels by six hundred and forty pixels, the length of each of the electrodes 32 is substantially equal to six hundred and forty pixels.

The first liquid crystal layer 34 may comprise any suitable liquid crystal material and may comprise guest host liquid crystal for example. The first liquid crystal layer 34 is configured to be substantially opaque to light transmitted from the pixel 30 when the voltage across the liquid crystal layer 34 is below a predetermined threshold (for example, below six volts). The first liquid crystal layer 34 is configured to be substantially transparent to light transmitted from the pixel 30 when the voltage across the liquid crystal layer 34 is above the predetermined threshold (for example, above six volts).

It should be understood that light emitted from the pixel 30 is passed through a polarizer prior to entry into the first liquid crystal layer 34 (the polarizer may form part of the first liquid crystal layer 34 or may be a separate layer). When the voltage across the first liquid crystal layer 34 is below the predetermined threshold, the polarization of the first liquid crystal layer 34 is substantially perpendicular to the polarization of the polarizer and is consequently opaque. When the voltage across the first liquid crystal layer 34 is above the predetermined threshold, the polarization of the first liquid crystal layer 34 is substantially parallel to the polarization of the polarizer and is consequently transparent.

It should be understood that the wording 'opaque' means that a liquid crystal layer is at least substantially opaque and may be partially transparent. It should also be understood that the wording 'transparent' means that a liquid crystal layer is at least substantially transparent and may be partially opaque.

The transparent electrode 36 may comprise any transparent conductive material and may comprise indium-tin-oxide (ITO) for example. The transparent electrode 36 forms a single layer that extends over the first plurality of transparent electrodes 32 and is connected to ground.

In FIG. 2A, a control signal 38 is provided to the electrodes labeled with the reference numerals $32_2, 32_4, 32_6$ and $32_8$ from the controller 12 so that they provide an electric field across the first liquid crystal layer 34 with a voltage above the predetermined threshold voltage of the first liquid crystal layer 34. Consequently, the portions of the first liquid crystal layer 34 adjacent the electrodes $32_2, 32_4, 32_6, 32_8$ are substantially transparent. The electric field (if any) provided by electrodes $32_1, 32_3, 32_5, 32_7$ across the first liquid crystal layer 34 has a voltage below the predetermined threshold voltage of the first liquid crystal layer 34. Consequently, the portions of the first liquid crystal layer 34 adjacent the electrodes $32_1, 32_3, 32_5$ and $32_7$ are substantially opaque.

In this first configuration of the first plurality of electrodes 32, the first liquid crystal layer 34 has a plurality of opaque regions and a plurality of transparent regions. Since each of the first plurality of transparent electrodes has a length that is substantially equal to the length of the vertical dimension of the display 22, the plurality of opaque regions form a plurality of gratings across the display 22.

Light emitted from the pixel 30 is blocked by the plurality of opaque regions and passes through the plurality of transparent regions. The plurality of transparent regions provides the light from the pixel 30 across a first angular viewing range $\theta_1$. An 'angular viewing range' is defined as the range of angles through which a user may view the light emitted from the pixels of the display 22. The light emitted from the display 22 may be considered to form an arc from the device 10 and the angular viewing range is the central angle of the arc.

If one considers that a transparent region in the first liquid crystal layer 34 has a width w and a depth d, the first angular viewing range $\theta_1$ is given by:

$$\theta_1 = 2.\tan^{-1}(w/d) \qquad \text{Equation 1}$$

Figure 2B:
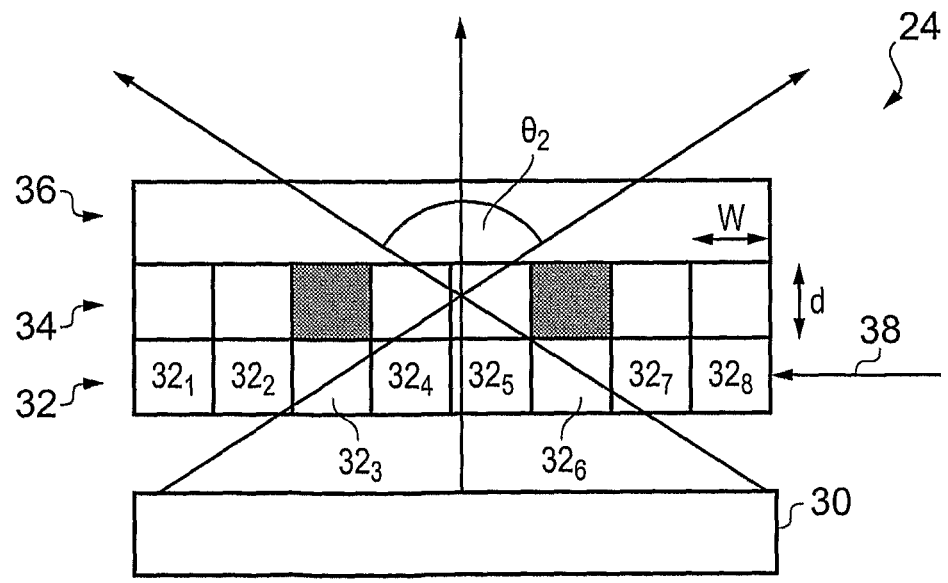
FIG. 2B illustrates a cross sectional schematic diagram of the apparatus illustrated in FIG. 2A having a second different angular viewing range.

FIG. 2B illustrates a cross sectional schematic diagram of the apparatus 24 illustrated in FIG. 2A having a second different angular viewing range $\theta_2$. In FIG. 2B, the control signal 38 is provided to the electrodes labeled with the reference numerals $32_1$, $32_2$, $32_4$, $32_5$, $32_7$ and $32_8$ from the controller 12 so that they provide an electric field across the first liquid crystal layer 34 with a voltage above the predetermined threshold voltage of the first liquid crystal layer 34. Consequently, the portions of the first liquid crystal layer 34 adjacent the electrodes $32_1$, $32_2$, $32_4$, $32_5$, $32_7$ and $32_8$ are substantially transparent. The electric field (if any) provided by electrodes $32_3$ and $32_6$ across the first liquid crystal layer 34 has a voltage below the predetermined threshold voltage of the first liquid crystal layer 34. Consequently, the portions of the first liquid crystal layer 34 adjacent the electrodes $32_3$ and $32_6$ are substantially opaque.

In this second configuration of the first plurality of electrodes 32, the first liquid crystal layer 34 has a plurality of opaque regions and a plurality of transparent regions which provide a second angular viewing range $\theta_2$. The second angular viewing range $\theta_2$ is given by:

$$\theta_2 = 2.\tan^{-1}(2w/d) \qquad \text{Equation 2}$$

From equations 1 and 2, it should be understood that the first angular viewing range has a different angular viewing range to the second angular viewing range. In particular, it should be understood that the second angular viewing range is greater than the first angular viewing range.

In another configuration, the control signal 38 may also be provided to all of the electrodes in the first plurality of transparent electrodes 32 so that they provide an electric field across the first liquid crystal layer 34 with a voltage above the predetermined threshold voltage of the first liquid crystal layer 34.

Consequently, the first liquid crystal layer 34 adjacent the first plurality of electrodes 32 is substantially transparent and does not substantially restrict the passage of light from the pixel 30. In this configuration, the apparatus 24 does not substantially restrict the angular viewing range of the display 22 and consequently, the angular viewing range of the display 22 is at a maximum.

Figure 3:
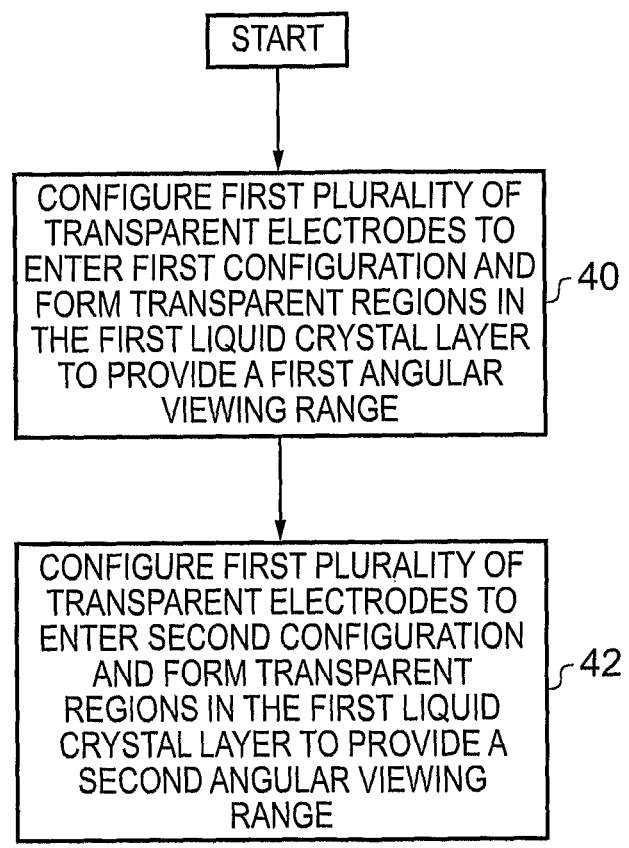
FIG. 3 illustrates a flow diagram of a method for changing the angular viewing range of an apparatus according to various embodiments of the invention.

FIG. 3 illustrates a flow diagram of a method for changing the angular viewing range of the apparatus 24. At block 40, the method includes configuring the first plurality of electrodes 32 to enter the first configuration and form transparent regions in the first liquid crystal layer 34 to provide the first angular viewing range $\theta_1$. At block 42, the method includes configuring the first plurality of electrodes 32 to enter the second configuration and form transparent regions in the first liquid crystal layer 34 to provide the second angular viewing range $\theta_2$.

Embodiments of the present invention provide an advantage in that the angular viewing range of the display 22 may be controlled via the apparatus 24. For example, if a user is using the device 10 in a public place (a train carriage for example) and does not wish for other passengers to view the information displayed on the display 22, the apparatus 24 may enter the first configuration and provide a smaller angular viewing range. If the user is using the device 10 in a private place (at home for example) and would like to be able to view the display 22 from a wide range of angles, the apparatus 24 may enter the second configuration and provide a larger angular viewing range.

A further advantage of embodiments of the present invention is that the apparatus 24 may provide a successively changeable angular viewing range from the display 22. The first plurality of transparent electrodes 32 of the apparatus 24 may be configured to have a plurality of different configurations (that is, more than two configurations) which provide a plurality of different angular viewing ranges. This may be particularly advantageous where the user of the device 10 wishes to use numerous different angular viewing ranges for different locations.

Figure 4A:
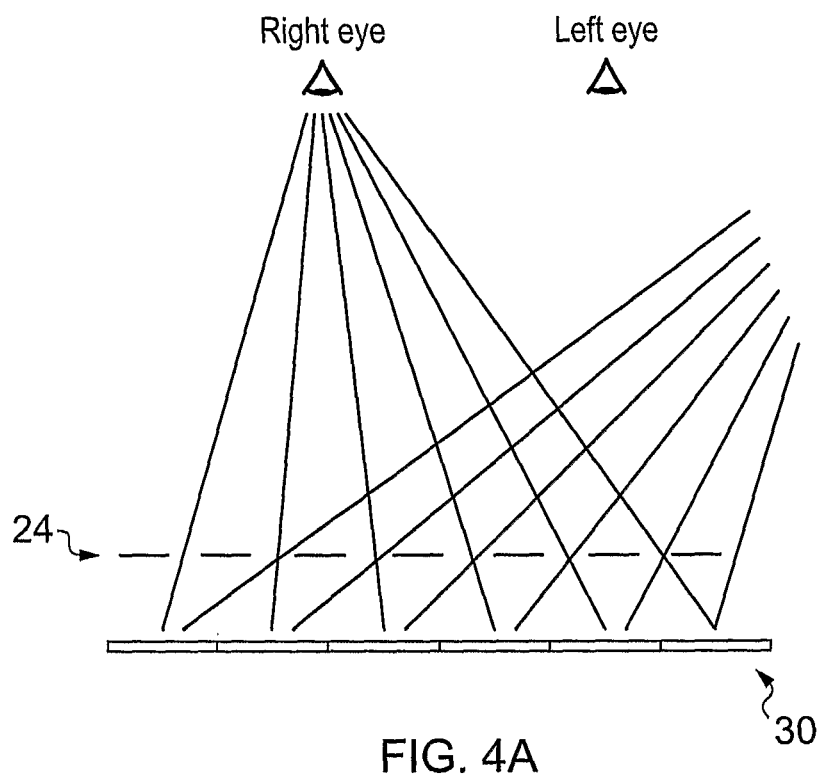
FIG. 4A illustrates a cross sectional schematic diagram of an apparatus having an angular viewing range oriented in a first direction according to various embodiments of the invention.

FIG. 4A illustrates a cross sectional schematic diagram of an apparatus 24 having an angular viewing range oriented in a first direction. The apparatus 24 illustrated in FIG. 4A is similar to the apparatus illustrated in FIGS. 2A, 2B and includes substantially the same features. The apparatus 24 is positioned adjacent a plurality of pixels 30 of the display 22.

In FIG. 4A, the first plurality of transparent electrodes 32 are configured by the controller 12 to have a third configuration. In the third configuration, a subset of the electrodes 32 provide electric fields across the first liquid crystal layer 34 to form a plurality of transparent regions and a plurality of opaque regions in the first liquid crystal layer 34. The plurality of transparent regions enables light from the pixels 30 to pass through the apparatus 24 and be received at a right eye of a user. The plurality of opaque regions substantially prevents light from pixels 30 being received at the user's left eye. Consequently, the apparatus 24 provides an angular viewing range oriented in a first direction towards a right eye of a user.

Figure 4B:
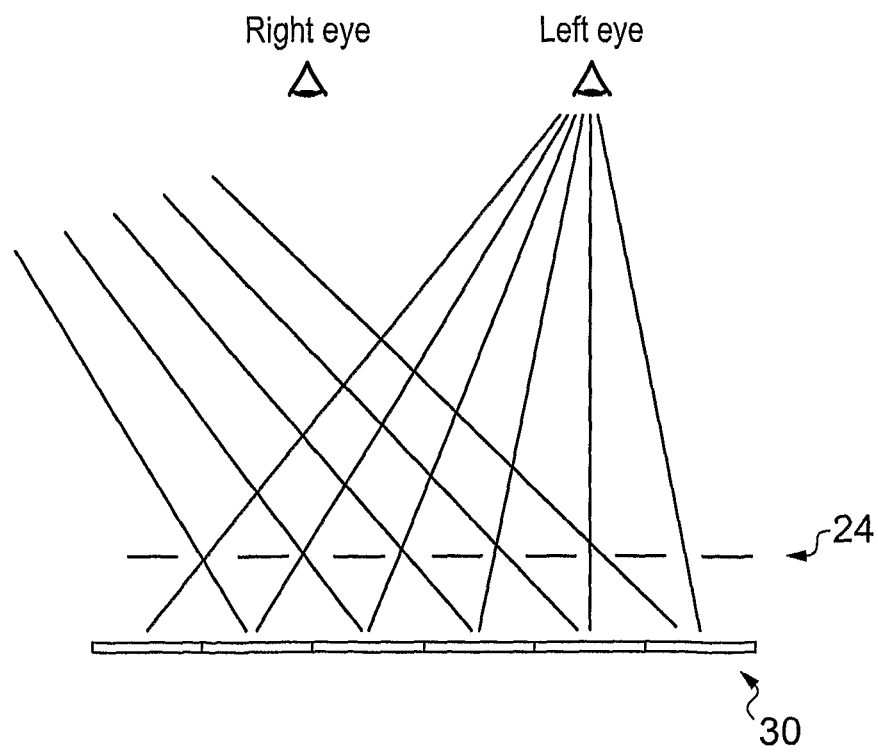
FIG. 4B illustrates a cross sectional schematic diagram of the apparatus illustrated in FIG. 4A having an angular viewing range oriented in a second different direction.

FIG. 4B illustrates a cross sectional schematic diagram of the apparatus 24 having an angular viewing range oriented in a second different direction. The first plurality of transparent electrodes 32 are configured by the controller 12 to have a fourth configuration. In the fourth configuration, a subset of the electrodes 32 provide electric fields across the first liquid crystal layer 34 to form a plurality of transparent regions and a plurality of opaque regions in the first liquid crystal layer 34. The plurality of transparent regions enables light from the pixels 30 to pass through the apparatus 24 and be received at a left eye of a user. The plurality of opaque regions substantially prevents light from the pixels 30 being received at the user's right eye. Consequently, the apparatus 24 provides an angular viewing range oriented in a second direction towards a left eye of a user.

Figure 5:
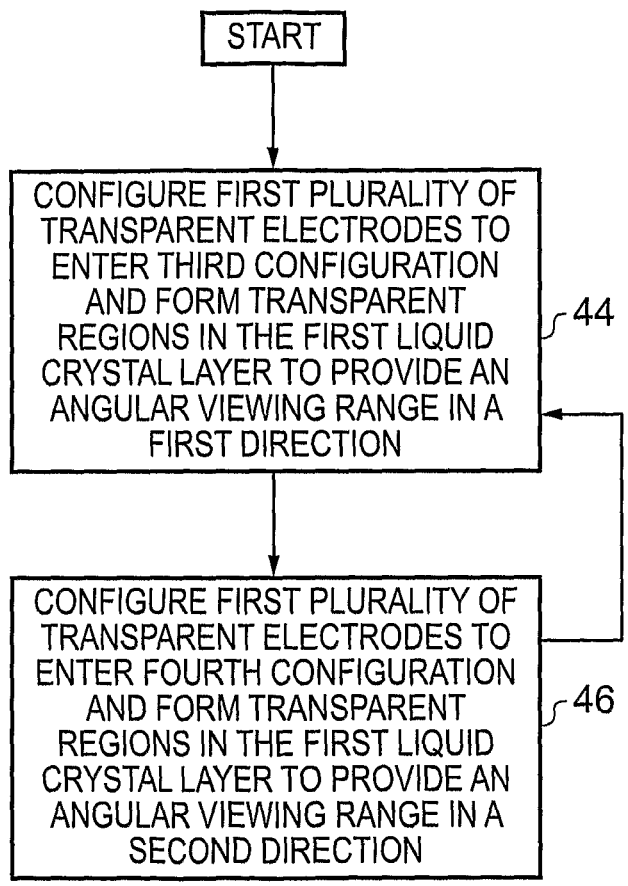
FIG. 5 illustrates a flow diagram of a method for changing the orientation of an angular viewing range of an apparatus according to various embodiments of the invention.

FIG. 5 illustrates a method for changing the orientation of an angular viewing range of the apparatus 24. At block 44, the method includes configuring the first plurality of electrodes 32 to enter the third configuration and form transparent regions in the first liquid crystal layer 34 to provide an angular viewing range oriented in the first direction (for example, directed to a user's right eye). The controller 12 may also control the display 22 to display an image for the user's right eye.

At block 46, the method includes configuring the first plurality of electrodes 32 to enter the fourth configuration and form transparent regions in the first liquid crystal layer 34 to provide an angular viewing range oriented in the second direction (for example, directed to a user's left eye). The controller 12 may also control the display 22 to display an image for the user's left eye. If the images displayed by the display 22 at blocks 44 and 46 are stereoscopic images and are presented in quick succession (at a rate of one hundred and twenty hertz for example), they may form a three dimensional image when viewed by the user.

The method then may move back to block 44 and repeat. The stereoscopic images displayed by the display 22 at repeated blocks 44 and 46 may be the same as those described above or may be different and form a different three dimensional image.

Embodiments of the present invention provide an advantage in that the apparatus 24 may enable the device 10 to provide three dimensional images to a user without the need for any accessories such as three dimensional glasses. Furthermore, since the whole of the display 22 area may be used alternately for each stereoscopic image, the resolution of the three dimensional is relatively high (since the resolution of the stereoscopic three dimensional images may have the same resolution as the display 22).

Figure 6:
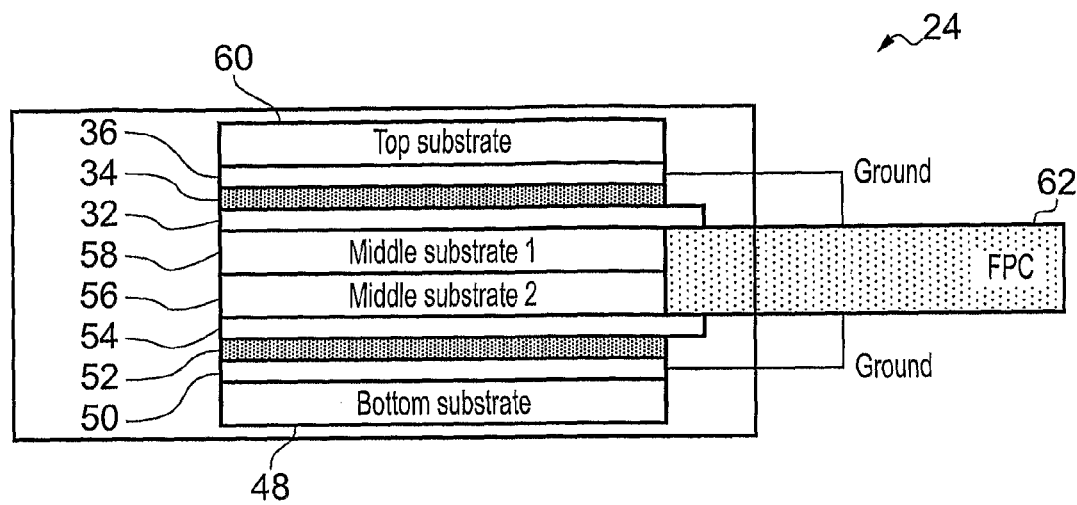
FIG. 6 illustrates a cross sectional schematic diagram of another apparatus according to various embodiments of the invention.

FIG. 6 illustrates a schematic cross sectional diagram of another apparatus 24 according to various embodiments of the invention. The apparatus 24 illustrated in FIG. 6 is similar to the apparatus illustrated in FIGS. 2A, 2B and where the features are similar, the same reference numerals are used.

The apparatus 24 has a laminate structure and comprises (in order in which the laminas are arranged) a bottom substrate 48, a transparent electrode 50, a second liquid crystal layer 52, a second plurality of substantially transparent electrodes 54, a second middle substrate 56, a first middle substrate 58, the first plurality of transparent electrodes 32, the first liquid crystal layer 34, the transparent electrode 36 and a top substrate 60. The apparatus 24 also includes a flexible printed circuit board 62 that is connected to the first middle substrate 58 and to the second middle substrate 56. The transparent electrodes 50 and 36 are connected to ground via the flexible printed circuit board 62.

The second plurality of substantially transparent electrodes 54, the second liquid crystal layer 52 and the transparent electrode 50 are similar to the first plurality of substantially transparent electrodes 32, the first liquid crystal layer 34 and the transparent electrode 36 respectively and function in a similar manner.

The bottom substrate 48, the second middle substrate 56, the first middle substrate 58 and the top substrate 60 may comprise any substantially transparent material. The transparent electrode 50 is provided on the bottom substrate 48, the second plurality of transparent electrodes 54 is provided on the second middle substrate 56, the first plurality of transparent electrodes 32 is provided on the first middle substrate 58 and the transparent electrode 36 is provided on the top substrate 60. The electrodes 50, 54, 32 and 36 may be provided on the substrates 48, 56, 58 and 60 respectively using any suitable technique. For example, the electrodes 50, 54, 32 and 36 may be provided via electron beam evaporation, physical vapor deposition or sputter deposition. The pattern of the electrodes 54 and 32 may be provided via an etching technique.

Figure 7:
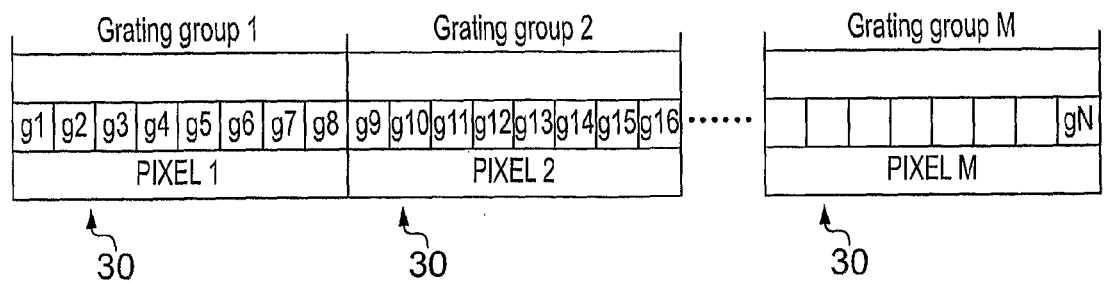
FIG. 7 illustrates a schematic diagram of pixels of a display and grating groups of the apparatus illustrated in FIG. 6.

FIG. 7 illustrates a schematic diagram of how a row of pixels of the display 22 are aligned with grating groups of the apparatus 24. In more detail, FIG. 7 illustrates that each pixel 30 of the display 22 is aligned and overlaid with a grating group that is formed from sixteen transparent electrodes (eight from the first plurality of electrodes 32 and eight from the second plurality of electrodes 54). The transparent electrodes are configured to control the first and second liquid crystal layers 52, 34 to form gratings g1 to gN which may be transparent or opaque depending on the electric field applied by the electrodes. For example, pixel number one of the display 22 is overlaid with grating group one that comprises gratings g1 to g8. Pixel number two of the display 22 is overlaid with grating group two that comprises gratings g9 to g16. Pixel M (which may be last pixel in the row of pixels) is overlaid with grating group M which comprises gratings gN-7 to gN.

Figure 8:
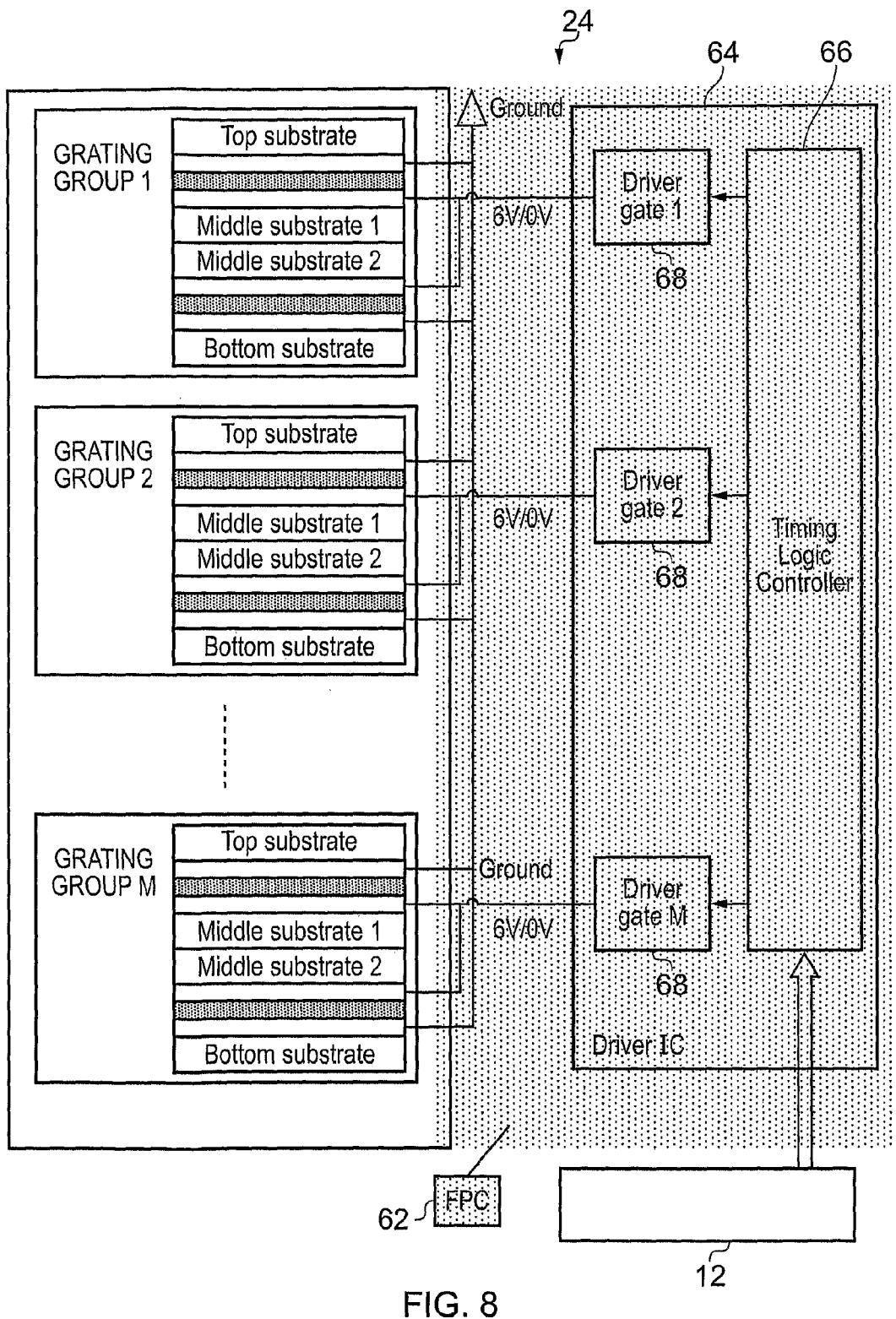
FIG. 8 illustrates a schematic diagram of electrical circuitry of the apparatus illustrated in FIGS. 6 and 7.

FIG. 8 illustrates a schematic diagram of electrical circuitry of the apparatus 24 illustrated in FIGS. 6 and 7. The apparatus 24 comprises grating groups one to M and a driver integrated circuit 64 mounted on the flexible printed circuit board 62. The driver integrated circuit 64 includes a timing logic controller 66 and a plurality of driver gates 1 to M labeled with reference numeral 68.

The plurality of driver gates 1 to M are each connected to a corresponding grating group 1 to M. Each driver gate 68 is electrically connected to each of the plurality of electrodes 32, 54 in its respective grating group and is configured to control the electric field applied by each of the electrodes 32, 54.

The timing logic controller 66 is configured to receive control signals from the controller 12 of the device 10 (via a mobile control interface for example such as a service provider interface (SPI) or an inter-integrated circuit (I$^2$C)). The timing logic controller 66 is configured to use the control signals from the controller 12 to provide a control signal to the driver gates 68. The driver gates 68 are configured to apply a voltage (six volts for example) to electrodes of the first plurality of electrodes 32 and the second plurality of electrodes 54 in order to obtain a configuration having a particular angular viewing range and/or an angular viewing range oriented in a particular direction.

Figure 9:
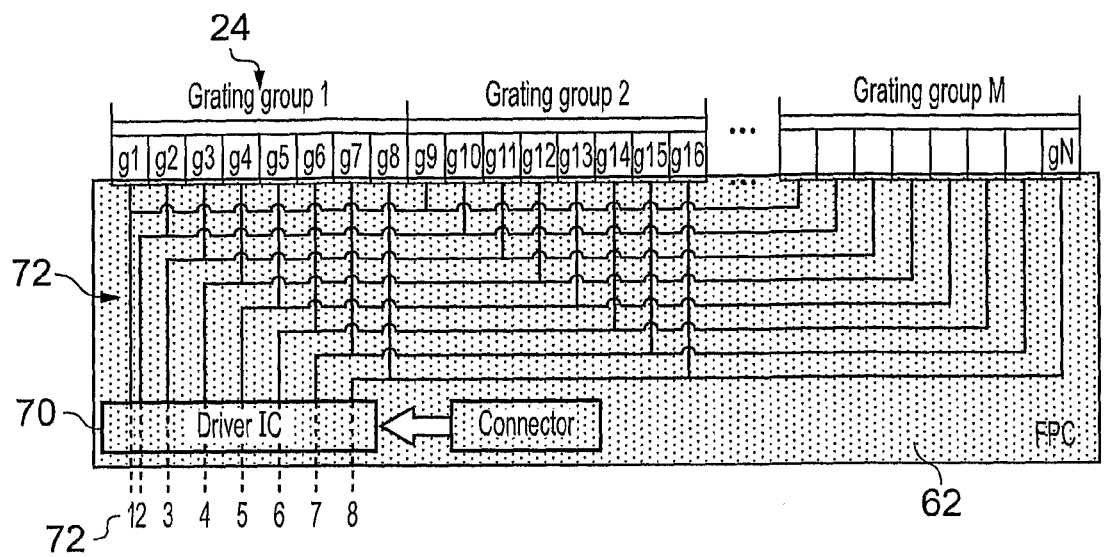
FIG. 9 illustrates a schematic diagram of alternative electrical circuitry for the apparatus illustrated in FIGS. 6, 7 and 8.

FIG. 9 illustrates a schematic diagram of alternative electrical circuitry of the apparatus 24 illustrated in FIGS. 6 and 7. In this embodiment, the driver integrated circuit 70 includes eight control lines 72 that are connected to the grating groups 1 to M. The first control line $72_1$ is connected to a first electrode of the first plurality of electrodes 32 and the second plurality of electrodes 54 in the each of the grating groups 1 to M. The second control line $72_2$ is connected to a second electrode of the first plurality of electrodes 32 and the second plurality of electrodes 54 in each of the grating groups 1 to M. The third control line $72_3$ is connected to a third electrode of the first plurality of electrodes 32 and the second plurality of electrodes 54 in each of the grating groups 1 to M. The fourth control line $72_4$ is connected to a fourth electrode of the first plurality of electrodes 32 and the second plurality of electrodes 54 in each of the grating groups 1 to M. The fifth control line $72_5$ is connected to a fifth electrode of the first plurality of electrodes 32 and the second plurality of electrodes 54 in each of the grating groups 1 to M. The sixth control line $72_6$ is connected to a sixth electrode of the first plurality of electrodes 32 and the second plurality of electrodes 54 in each of the grating groups 1 to M. The seventh control line $72_7$ is connected to a seventh electrode of the first plurality of electrodes 32 and the second plurality of electrodes 54 in each of the grating groups 1 to M. The eighth control line $72_8$ is connected to an eighth electrode of the first plurality of electrodes 32 and the second plurality of electrodes 54 in each of the grating groups 1 to M.

The embodiment illustrated in FIG. 9 provides an advantage in that only eight control lines 72 are required for controlling each of the gratings in the apparatus 24. This may advantageously reduce the complexity and cost for manufacturing the apparatus 24.

Figure 10A:
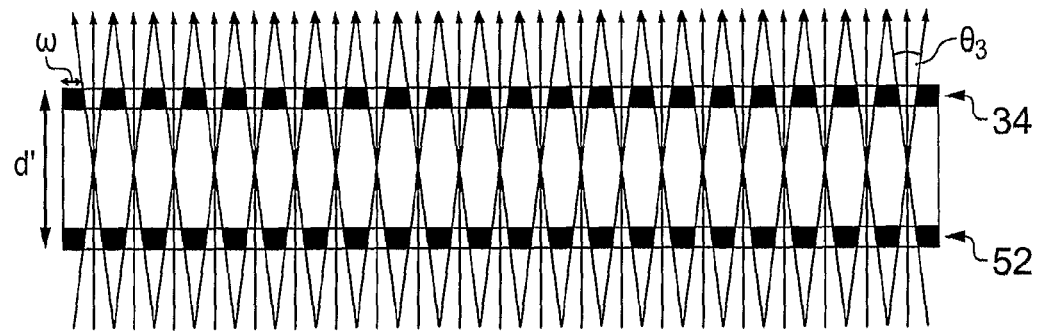
FIG. 10A illustrates a cross sectional diagram of the apparatus illustrated in FIGS. 6 to 9 having a first angular viewing range.

FIG. 10A illustrates a cross sectional diagram of the apparatus 24 illustrated in FIGS. 6 to 9 having a configuration providing a first angular viewing range. Only the first and second liquid crystal layers 34 and 52 are illustrated for clarity purposes and it should be appreciated that the apparatus 24 includes the features described above with reference to FIGS. 6 to 9.

The first plurality of electrodes 32 and the second plurality of electrodes 54 have a configuration in which alternating electrodes (that is, every other electrode) provide an electric field across the first and second liquid crystal layers 34, 52 respectively having a voltage above the predetermined threshold voltage of the first and second liquid crystal layers 34, 52. Consequently, the first and second liquid crystal layers 34, 52 have a plurality of opaque regions and a plurality of transparent regions with a width w (which is substantially equal to the width of a transparent electrode).

If one considers that the transparent regions in the first liquid crystal layer 34 and the second liquid crystal layer 52 have a width w and a depth d' (measured from the bottom of the second liquid crystal layer 52 to the top of the first liquid crystal layer 34), the angular viewing range $\theta_3$ of the configuration illustrated in FIG. 10A is given by:

$$\theta_3 = 2.\tan^{-1}(w/d')$$  Equation 3

Figure 10B:
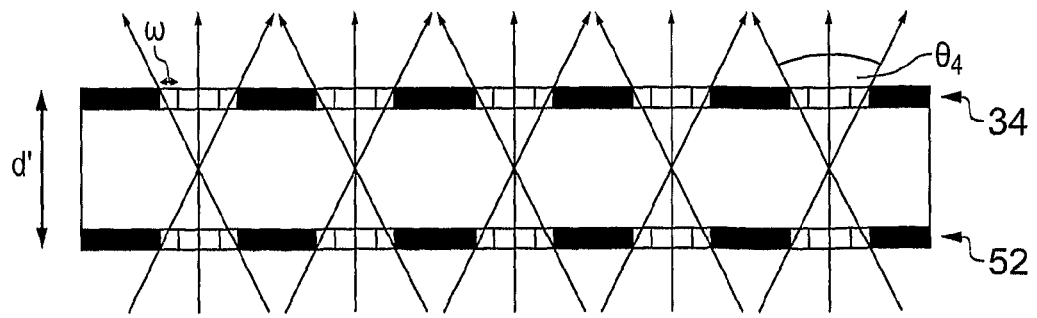
FIG. 10B illustrates a cross sectional diagram of the apparatus illustrated in FIGS. 6 to 10A having a second different angular viewing range.

FIG. 10B illustrates a cross sectional diagram of the apparatus 24 illustrated in FIGS. 6 to 10A having a configuration providing a second angular viewing range. As with FIG. 10A, only the first and second liquid crystal layers 34 and 52 are illustrated for clarity purposes and it should be appreciated that the apparatus 24 includes the features described above with reference to FIGS. 6 to 9.

The first plurality of electrodes 32 and the second plurality of electrodes 54 have a configuration in which four adjacent electrodes in each plurality 32, 54 provide a transparent region in the first and second liquid crystal layers 34, 52 and the subsequent four adjacent electrodes in each plurality 32, 54 provide an opaque region in the first and second liquid crystal layers 34, 52. Consequently, the first and second liquid crystal layers 34, 52 have a plurality of alternating opaque and transparent regions each having a width equal to 4w (which is substantially equal to four times the width of a transparent electrode).

If one considers that the transparent regions in the first liquid crystal layer 34 and the second liquid crystal layer 52 have a width 4w and a depth d' (measured from the bottom of the second liquid crystal layer 52 to the top of the first liquid crystal layer 34), the angular viewing range $\theta_4$ of the configuration illustrated in FIG. 10B is given by:

$$\theta_4 = 2.\tan^{-1}(4w/d')$$  Equation 4

In another configuration, the first plurality of transparent electrodes 32 and the second plurality of transparent electrodes 50 may be configured so that they provide electric fields across the first liquid crystal layer 34 and the second liquid crystal layer 52 with a voltage above the predetermined threshold voltage of the first liquid crystal layer 34 and the second liquid crystal layer 52. Consequently, the first and second liquid crystal layers 34, 52 are substantially transparent and do not substantially restrict the passage of light from the pixels of the display 22. In this configuration, the apparatus 24 does not substantially restrict the angular viewing range of the display 22 and consequently, the angular viewing range of the display 22 is at a maximum.

The apparatus 24 illustrated in FIGS. 6 to 10B provides an advantage in that the depth d' may be relatively large and the apparatus 24 may therefore provide relatively small angular viewing ranges for the display 22. Consequently, the apparatus 24 illustrated in FIGS. 6 to 10B may be particularly suitable for use in public places where the information displayed on the display 22 is strictly private (for example, the information may be bank account details).

The apparatus 24 may also provide a successively changeable angular viewing range from the display 22. The first plurality of transparent electrodes 32 and the second plurality of transparent electrodes 54 may be configured to have a plurality of different configurations (that is, more than two configurations) which provide a plurality of different angular viewing ranges. This may be particularly advantageous where the user of the device 10 wishes to uses numerous different angular viewing ranges for different locations.

Figure 11:
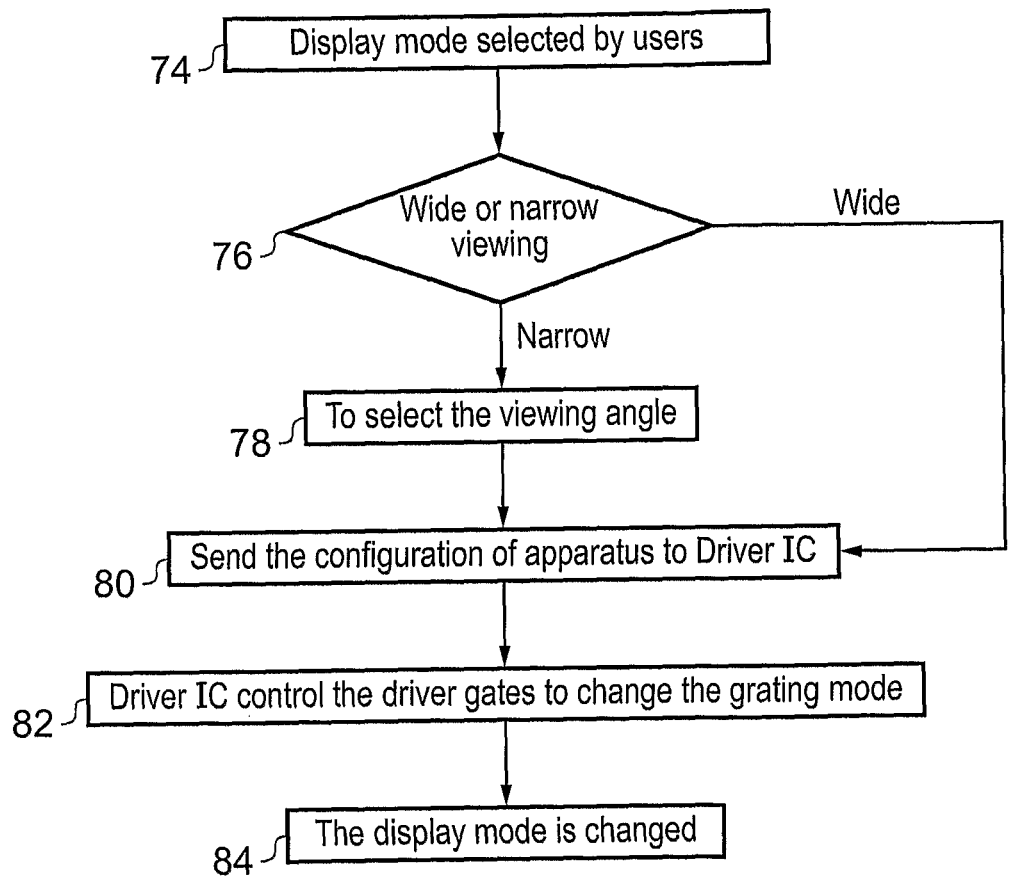
FIG. 11 illustrates a flow diagram of a method for changing the angular viewing range of the apparatus illustrated in FIGS. 6 to 10B.

FIG. 11 illustrates a flow diagram of a method for changing the angular viewing range of the apparatus illustrated in FIGS. 6 to 10B. At block 74, the controller 12 controls the display 22 to display a graphical user interface that includes a user selectable object for 'wide viewing' mode and a user selectable object for 'narrow viewing' mode. The user may control the user input device 20 to select either the wide viewing mode or the narrow viewing mode.

At block 76, the controller 12 receives a signal from the user input device 20 and the controller 12 determines from the signal whether the user has selected the wide viewing mode or the narrow viewing mode.

If the user selects the narrow viewing mode, the method moves to block 78 and the controller 12 controls the display 22 to display one or more angular viewing ranges that may be selected by the user. The user may operate the user input device 20 to select a particular angular viewing range.

At block 80, the controller 12 determines the configuration for the first plurality of electrodes 32 and for the second plurality of electrodes 54 that will provide the selected angular viewing range. In various embodiments, the memory 14 may include a look up table that includes a list of angular viewing ranges and a list of the corresponding configurations of the first plurality of electrodes 32 and the second plurality of electrodes 54 that provide the angular viewing ranges. The controller 12 may access the look up table with a particular angular viewing range to obtain the correct configuration for the first plurality of electrodes 32 and the second plurality of electrodes 54. The controller 12 then sends the configuration for the first plurality of electrodes 32 and the second plurality of electrodes 54 to the driver integrated circuit 64, 70.

At block 82, the driver integrated circuit 64, 70 controls the driver gates 68 to obtain a particular arrangement of gratings (that is, a particular arrangement of transparent regions and opaque regions in the first and second liquid crystal layers 34, 52) so that the display mode is changed (block 84).

If the user selects the wide viewing angle at block 74/76, the method moves to block 80. At block 80, the controller 12 determines the configuration for the first plurality of electrodes 32 and for the second plurality of electrodes 54 that will provide the wide viewing angle. The controller 12 may access the look up table stored in the memory 14 to obtain the correct configuration for the first plurality of electrodes 32 and the second plurality of electrodes 54. The wide viewing angle mode may be provided by a configuration where the first plurality of electrodes 32 makes the first liquid crystal layer 34 wholly transparent (that is, with no opaque gratings) and where the second plurality of electrodes 54 makes the second liquid crystal layer 52 wholly transparent. The controller 12 then sends the configuration for the first plurality of electrodes 32 and the second plurality of electrodes 54 to the driver integrated circuit 64, 70. The method then moves to blocks 82 and 84 as described above.

Embodiments of the present invention provide an advantage in that the device 10 enables the user to select the angular viewing range for the display 22. This may enable the user to select the angular viewing range of the display 22 according to a desired range. For example, if the user feels that the information displayed on the display 22 is sensitive or private, he may control the graphical user interface to reduce the angular viewing range. Similarly, where the user would like to share the information displayed on the display with family, friends or colleagues (a photograph for example), he may control the graphical user interface to increase or maximize the angular viewing range.

Figure 12:
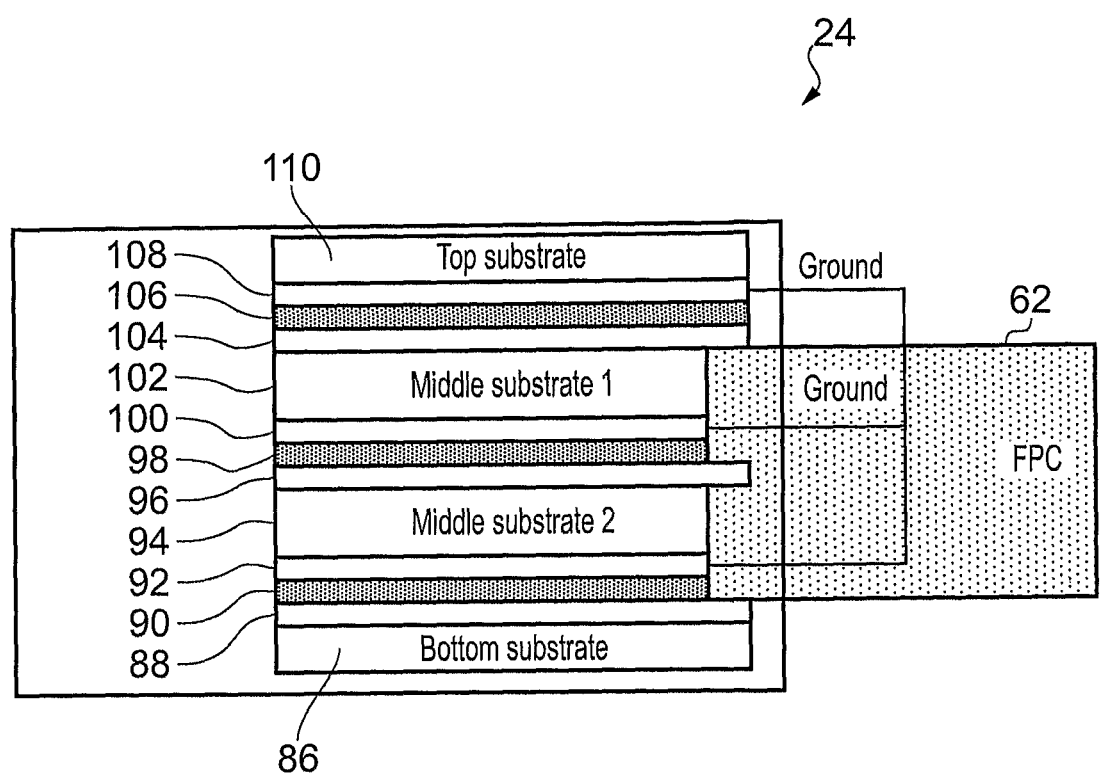
FIG. 12 illustrates a cross sectional schematic diagram of a further apparatus according to various embodiments of the invention.

FIG. 12 illustrates a cross sectional schematic diagram of a further apparatus 24 according to various embodiments of the invention. The apparatus 24 has a laminate structure and comprises (in order in which the laminas are arranged) a bottom substrate 86, a first plurality of transparent electrodes 88, a first liquid crystal layer 90, a transparent electrodes 92, a second middle substrate 94, a second plurality of transparent electrodes 96, a second liquid crystal layer 98, a transparent electrode 100, a first middle substrate 102, a third plurality of electrodes 104, a third liquid crystal layer 106, a transparent electrode 108 and top substrate 110. The apparatus 24 illustrated in FIG. 12 also includes a flexible printed circuit board. The transparent electrodes 92, 100 and 108 are connected to ground via the flexible printed circuit board 62.

The first plurality of transparent electrodes 88, the first liquid crystal layer 90, transparent electrode 92, the second plurality of transparent electrodes 96, the second liquid crystal layer 98 and the transparent electrode 100, the third plurality of transparent electrodes 104, the third liquid crystal layer 106 and the transparent electrode 108 are similar to electrode/liquid crystal layer arrangements described above with reference to FIGS. 2A, 2B, 4A, 4B, 10A and 10B and operate in a similar manner.

The bottom substrate 86, the second middle substrate 94, the first middle substrate 102 and the top substrate 110 may comprise any substantially transparent material. The first plurality of electrodes 88 are provided on the bottom substrate 86, the transparent electrode 92 is provided on the bottom surface of the second middle substrate 94, the second plurality of transparent electrodes 96 is provided on the upper surface of the second middle substrate 94, the transparent electrode 100 is provided on the bottom surface of the first middle substrate 102, the third plurality of transparent electrodes 104 is provided on the upper surface of the first middle substrate 102 and the transparent electrode 108 is provided on the top substrate 110. The electrodes 88, 92, 96, 100, 104 and 108 may be provided on the substrates 86, 94, 102 and 110 using any suitable technique. For example, the electrodes 88, 92, 96, 100, 104 and 108 may be provided via electron beam evaporation, physical vapor deposition or sputter deposition. The pattern of the electrodes 88, 96 and 104 may be provided via an etching technique.

Figure 13:
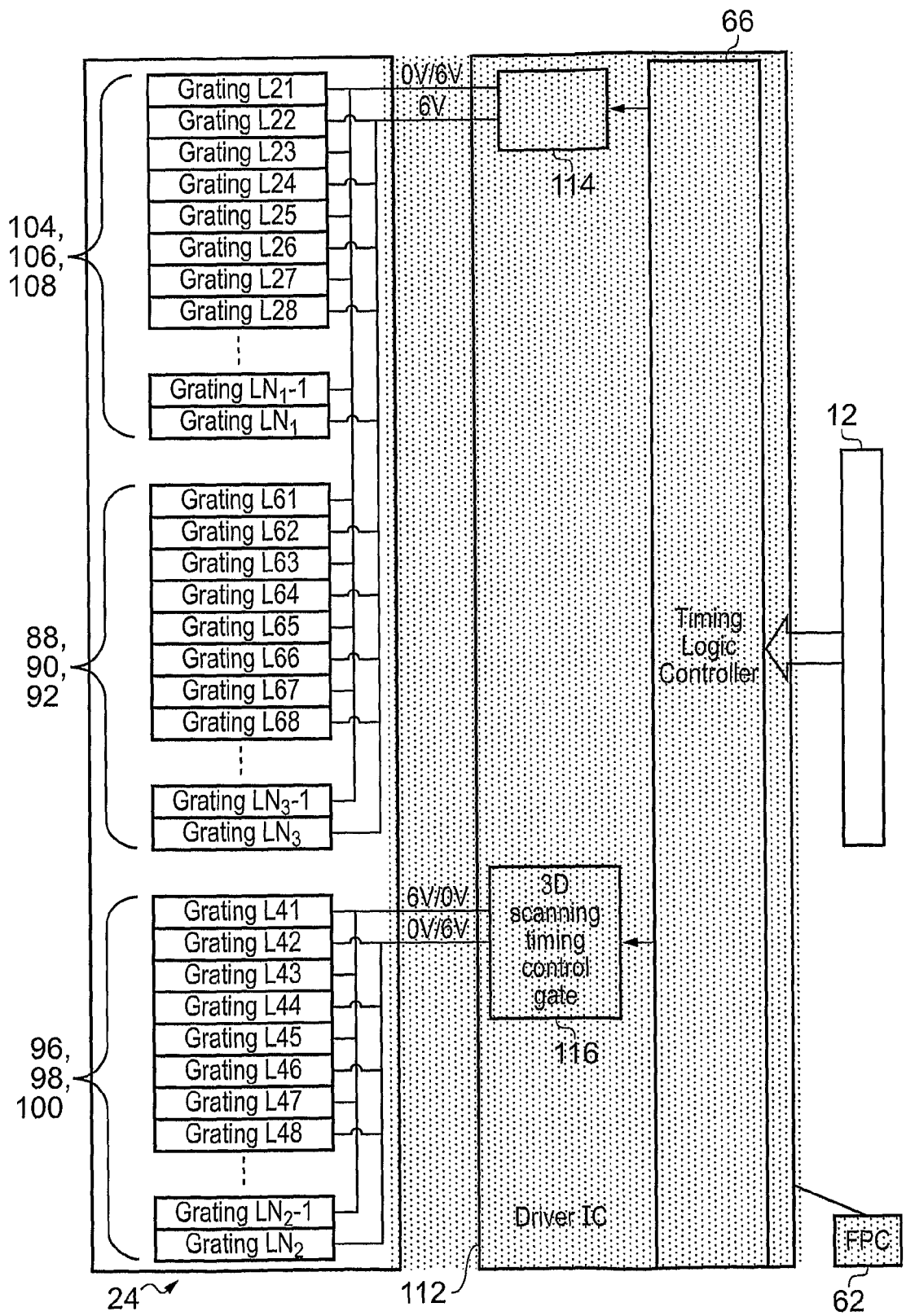
FIG. 13 illustrates a schematic diagram of electrical circuitry for the apparatus illustrated in FIG. 12.

FIG. 13 illustrates a schematic diagram of electrical circuitry for the apparatus 24 illustrated in FIG. 12. The electrical circuitry illustrated in FIG. 13 is similar to the electrical circuitry illustrated in FIGS. 8 and 9 and where the features are similar, the same reference numerals are used.

In this embodiment, the driver integrated circuit 112 includes a driver gate 114 and a three dimensional timing control gate 116 which are connected to the timing logic controller 66. The driver gate 114 is connected to each of the electrodes in the first plurality of transparent electrodes 88 and is also connected to each of the electrodes in the third plurality of transparent electrodes 104. The three dimensional timing control gate 116 is connected to each of the electrodes in the second plurality of transparent electrodes 96.

The driver gate 114 has an output control line that is fixed at six volts and is connected to alternate electrodes to form transparent regions in the first and third liquid crystal layers 90, 106. The driver gate 114 also has a control line that is switchable between zero volts and six volts and that is connected to the remaining electrodes which may form opaque regions, or may form transparent regions to render the first and third liquid crystal layers 90,106 substantially transparent.

The three dimensional timing control gate 116 has a control line connected to alternate electrodes in the second plurality of transparent electrodes 96 and which is switchable between zero volts and six volts. The three dimensional timing control gate 116 also has another control line connected to the remaining electrodes in the second plurality of transparent electrodes 96 and which is switchable between zero volts and six volts.

The operation of the apparatus 24 will be described with reference to FIGS. 14A, 14B, 15 and 16.

Figure 14A:
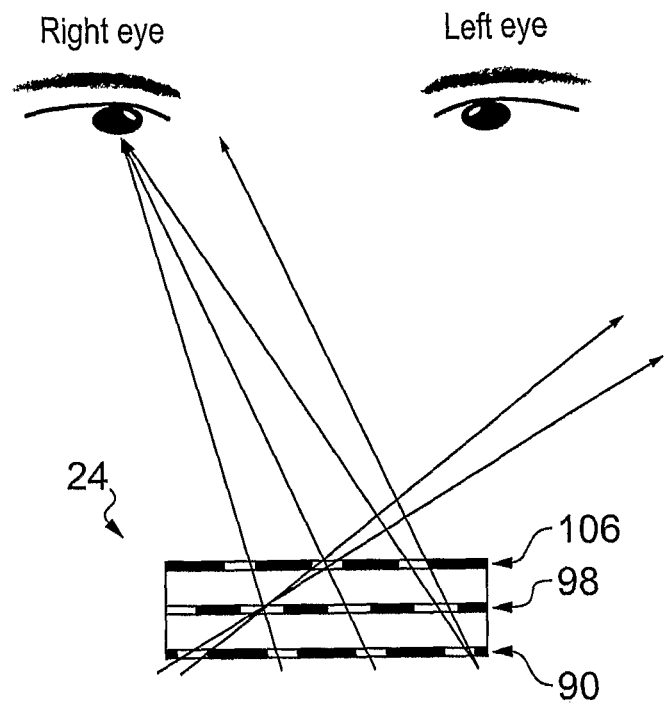
FIG. 14A illustrates a cross sectional schematic diagram of the apparatus illustrated in FIGS. 12, 13 having an angular viewing range oriented in a first direction.

FIG. 14A illustrates a cross sectional schematic diagram of the apparatus 24 illustrated in FIGS. 12, 13 having an angular viewing range oriented in a first direction. The first plurality of transparent electrodes 88, the second plurality of transparent electrodes 96 and the third plurality of transparent electrodes 104 are configured by the controller 12 and the driver integrated circuit 112 to have a 'right eye' configuration. In the 'right eye' configuration, a subset of the electrodes 88 provide electric fields across the first liquid crystal layer 90 to form a plurality of transparent regions and a plurality of opaque regions in the first liquid crystal layer 90. Additionally, a subset of the electrodes 96 provide electric fields across the second liquid crystal layer 98 to form a plurality of transparent regions and a plurality of opaque regions in the second liquid crystal layer 98. Furthermore, a subset of the electrodes 104 provide electric fields across the third liquid crystal layer 106 to form a plurality of transparent regions and a plurality of opaque regions in the third liquid crystal layer 106.

The plurality of transparent regions in the first, second and third liquid crystal layers 90, 98, 106 enable light from the pixels of the display 22 to pass through the apparatus 24 and be received at a right eye of a user. The plurality of opaque regions substantially prevents light from pixels from the display 22 being received at the user's left eye. Consequently, the apparatus 24 provides an angular viewing range oriented in a first direction towards a right eye of a user.

Figure 14B:
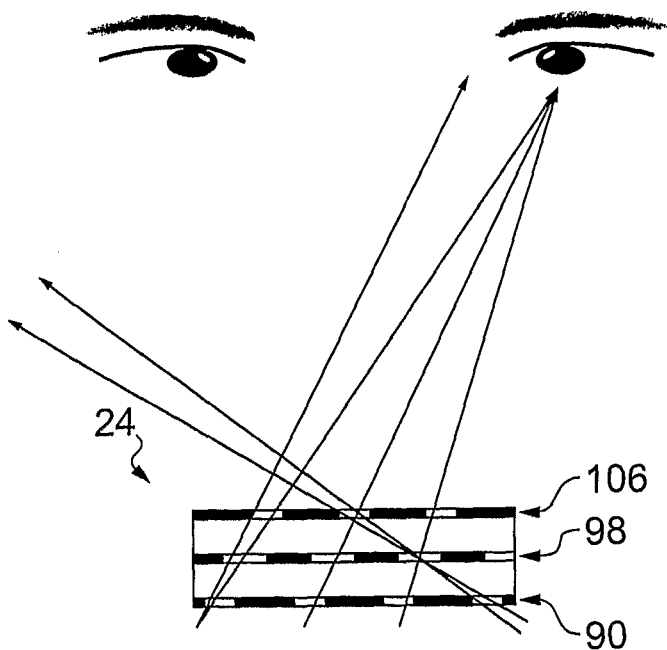
FIG. 14B illustrates a cross sectional schematic diagram of the apparatus illustrated in FIGS. 12, 13 and 14A having an angular viewing range oriented in a second different direction.

FIG. 14B illustrates a cross sectional schematic diagram of the apparatus 24 illustrated in FIGS. 12, 13, 14A having an angular viewing range oriented in a second direction. The first plurality of transparent electrodes 88, the second plurality of transparent electrodes 96 and the third plurality of transparent electrodes 104 are configured by the controller 12 and the driver integrated circuit 112 to have a 'left eye' configuration. In the 'left eye' configuration, a subset of the electrodes 88 provide electric fields across the first liquid crystal layer 90 to form a plurality of transparent regions and a plurality of opaque regions in the first liquid crystal layer 90. Additionally, a subset of the electrodes 96 provide electric fields across the second liquid crystal layer 98 to form a plurality of transparent regions and a plurality of opaque regions in the second liquid crystal layer 98. Furthermore, a subset of the electrodes 104 provide electric fields across the third liquid crystal layer 106 to form a plurality of transparent regions and a plurality of opaque regions in the third liquid crystal layer 106.

The plurality of transparent regions in the first, second and third liquid crystal layers 90, 98, 106 enable light from the pixels of the display 22 to pass through the apparatus 24 and be received at a left eye of a user. The plurality of opaque regions substantially prevents light from pixels from the display 22 being received at the user's right eye. Consequently, the apparatus 24 provides an angular viewing range oriented in a second direction towards a left eye of a user.

It should be appreciated that the transparent regions and the opaque regions in the first and third liquid crystal layers 90, 106 are the same for the 'right eye' configuration (FIG. 14A) and the 'left eye' configuration (FIG. 14B). The transparent regions in the second liquid crystal layer 98 in the 'right eye' configuration (FIG. 14A) are opaque regions in the 'left eye' configuration (FIG. 14B). Similarly, the opaque regions in the second liquid crystal layer 98 in the 'right eye' configuration (FIG. 14A) are transparent regions in the 'left eye' configuration (FIG. 14B).

Figure 15:
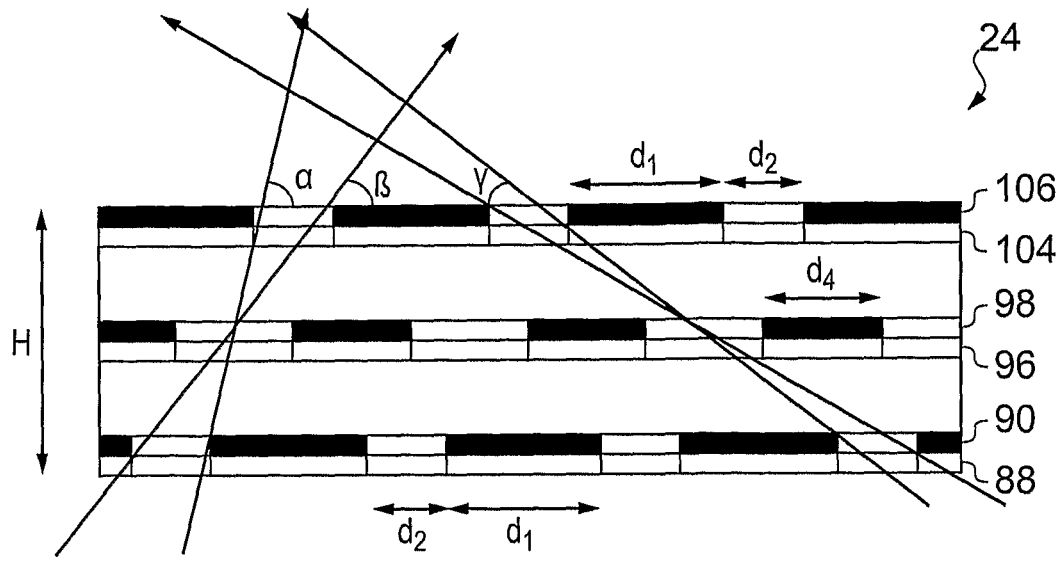
FIG. 15 illustrates a cross sectional diagram of the apparatus illustrated in FIGS. 12 to 14B and how light rays form an angular viewing range with a particular orientation.

FIG. 15 illustrates a cross sectional diagram of the apparatus 24 illustrated in FIGS. 12 to 14B and how light rays form an angular viewing range with a particular orientation (directed towards the user's left eye).

In this embodiment, the first plurality of transparent electrodes 88 includes a subset of electrodes having a width equal to $d_1$ and another subset of electrodes having a width equal to $d_2$ (which is less than $d_1$). The electrodes having a width of $d_1$ alternate with the electrodes having a width of $d_2$. The electrodes having a width d1 are connected to the control line from the driver gate 114 that is fixed at six volts. The electrodes having a width $d_2$ are connected to the control line from the driver gate 114 that is switchable between zero volts and six volts.

The third plurality of transparent electrodes 104 has a similar structure to the first plurality of transparent electrodes 88 (that is, the third plurality of electrodes 104 includes alternating electrodes having widths $d_1$ and $d_2$). However, the positioning of the electrodes in the third plurality of transparent electrodes 104 is offset laterally relative to the electrodes in the first plurality of electrodes 88.

The second plurality of transparent electrodes 96 include electrodes having a width equal to $d_4$ (where $d_4$ is less than $d_1$ and is greater than $d_2$). The apparatus 24 has a depth H measured from the bottom surface of the first liquid crystal layer 90 to the top surface of the third crystal layer 106.

The viewing angle from each group of gratings may be determined from equations 5 and 6.

$$\tan\alpha = \frac{H}{d2 - (d4 - d2)} \quad \text{Equation 5}$$

$$\tan\beta = \frac{H}{d2 + d2 + d2 - (d4 - d2)} \quad \text{Equation 6}$$

The angle of leakage γ from the apparatus 24 can be determined from equation 7.

$$\tan\gamma = \frac{H}{d1 + d1 - (d2 - (d4 - d2))} \quad \text{Equation 7}$$

Where the apparatus has the parameters, $d_1$=60 μm, $d_2$=30 μm, $d_4$=45 μm, H=600 μm and the distance between the user's eyes is 65 mm, it can be determined that the distance from the display 22 for the user to receive an image in the left eye and subsequently an image in the right eye is from 420 mm to 500 mm. This range of distances is applicable where the user's eyes are positioned centrally with the display 22.

Figure 16:
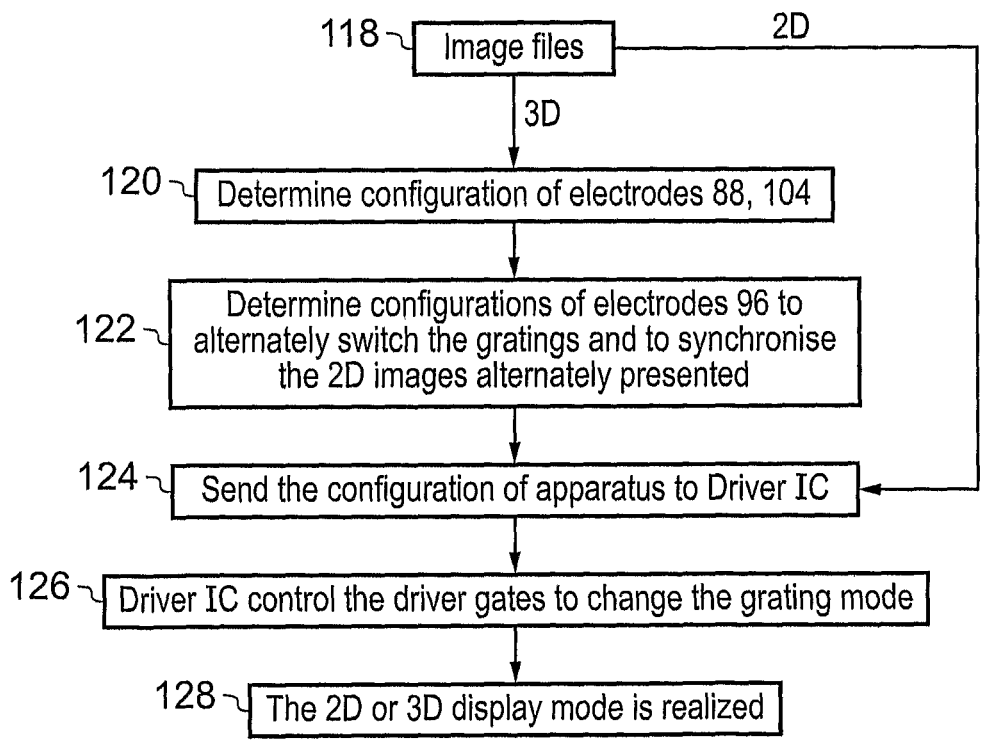
FIG. 16 illustrates a flow diagram of a method for changing the orientation of an angular viewing range of the apparatus illustrated in FIGS. 12 to 15.

FIG. 16 illustrates a flow diagram of a method for changing the orientation of an angular viewing range of the apparatus 24 illustrated in FIGS. 12 to 15. At block 118, the controller 12 reads one or more image files from the memory 14 and determines whether they are for two dimensional display or whether they are stereoscopic images and are for three dimensional display.

If the images are for three dimensional display, the method moves to block 120 and the controller 12 determines the configuration of the first plurality of transparent electrodes 88 and the third plurality of transparent electrodes 104. For example, the controller 12 may access a look up table stored in the memory 14 to obtain configuration data. The configuration of the first plurality of electrodes 88 and the third plurality of electrodes 104 may be the same as the configuration described above with reference to FIGS. 12 to 15.

At block 122, the controller 12 determines the configurations for the second plurality of electrodes 96 so that the gratings formed in the second liquid crystal layer 98 may be switched as illustrated in FIGS. 14A and 14B. The controller 12 also determines the synchronization for the stereoscopic images so that the right eye image is displayed on the display 22 while the apparatus 24 is in the configuration illustrated in FIG. 14A and so that the left eye image is displayed on the display 22 while the apparatus 24 is in the configuration illustrated in FIG. 14B.

At block 124, the controller 12 sends the configurations determined in blocks 120 and 122 to the driver integrated circuit 112. At block 126, the driver gates 114 and 116 are controlled by the timing logic controller 66 of the driver integrated circuit 112 to control the electrodes 88, 96 and 104 to form the desired gratings (for example, the right eye configuration illustrated in FIG. 14A). The controller 12 also controls the display 22 to display the stereoscopic image (for example, a stereoscopic image for the right eye).

Some or all of blocks 118, 120, 122, 124 and 126 are then repeated to provide a further stereoscopic image to the other eye of the user. This process may then be repeated so that stereoscopic images are alternately presented to the user's eyes at a refresh rate of one hundred and twenty hertz for example. Consequently, embodiments of the present invention provide a three dimensional display mode (block 128).

If the controller 12 determines that the images are two dimensional images at block 118, the method moves to block 124 and the controller 12 sends a control signal to the driver integrated circuit 112 that indicates that no gratings should be formed in the apparatus 24. In other embodiments, the controller 12 may send a configuration to the driver integrated circuit 112 so that one or more of the transparent electrode layers 88, 96 or 104 form a grating for changing the angular viewing range of the apparatus 24 as described above with reference to FIG. 2A for example.

Figure 17:
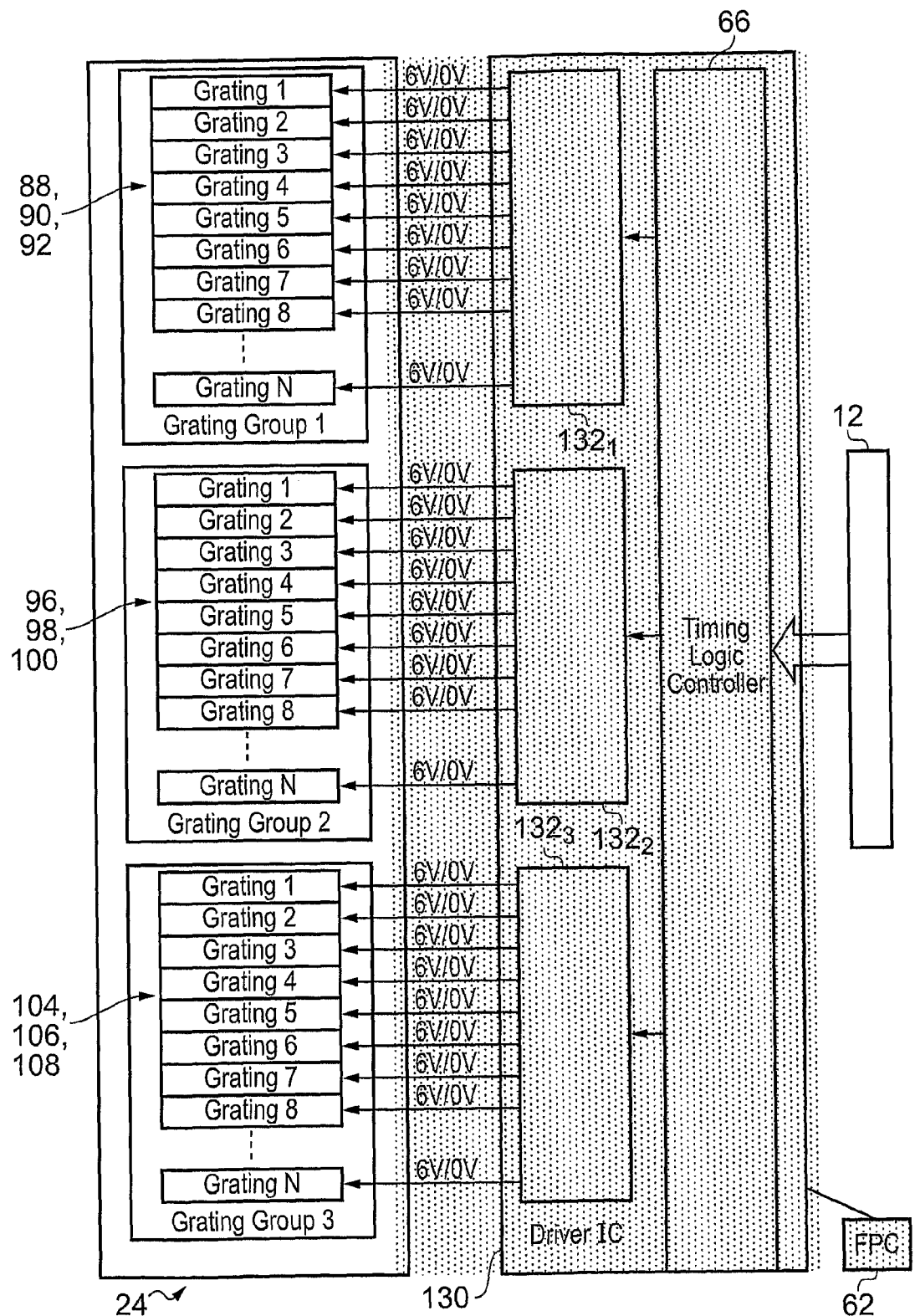
FIG. 17 illustrates a schematic diagram of another apparatus according to various embodiments of the invention and electrical circuitry for the apparatus.

FIG. 17 illustrates a schematic diagram of electrical circuitry of another apparatus 24. The apparatus 24 comprises the same laminate structure as the apparatus illustrated in FIG. 12. The electrical circuitry illustrated in FIG. 17 is similar to the electrical circuitry illustrated in FIGS. 8, 9 and 13 and where the features are similar, the same reference numerals are used.

In this embodiment, the driver integrated circuit 130 includes a first driver gate $132_1$, a second driver gate $132_2$ and a third driver gate $133_3$ which are connected to the timing logic controller 66. The first driver gate $132_1$ is connected to each of the electrodes in the first plurality of transparent electrodes 88 (grating group one). The second driver gate $132_2$ is connected to each of the electrodes in the second plurality of transparent electrodes 96 (grating group two). The third driver gate $132_3$ is connected to each of the electrodes in the third plurality of transparent electrodes 104 (grating group three).

The first driver gate 132₁ has output control lines that are switchable between six volts and zero volts and each of which is connected to a different electrode of the first plurality of electrodes 88 to form transparent and opaque regions in the first liquid crystal layer 90. The second driver gate 132₂ has output control lines that are switchable between six volts and zero volts and each of which is connected to a different electrode of the second plurality of electrodes 96 to form transparent and opaque regions in the second liquid crystal layer 100. The third driver gate 132₃ has output control lines that are switchable between six volts and zero volts and each of which is connected to a different electrode of the third plurality of electrodes 104 to form transparent and opaque regions in the third liquid crystal layer 108.

Figure 18:
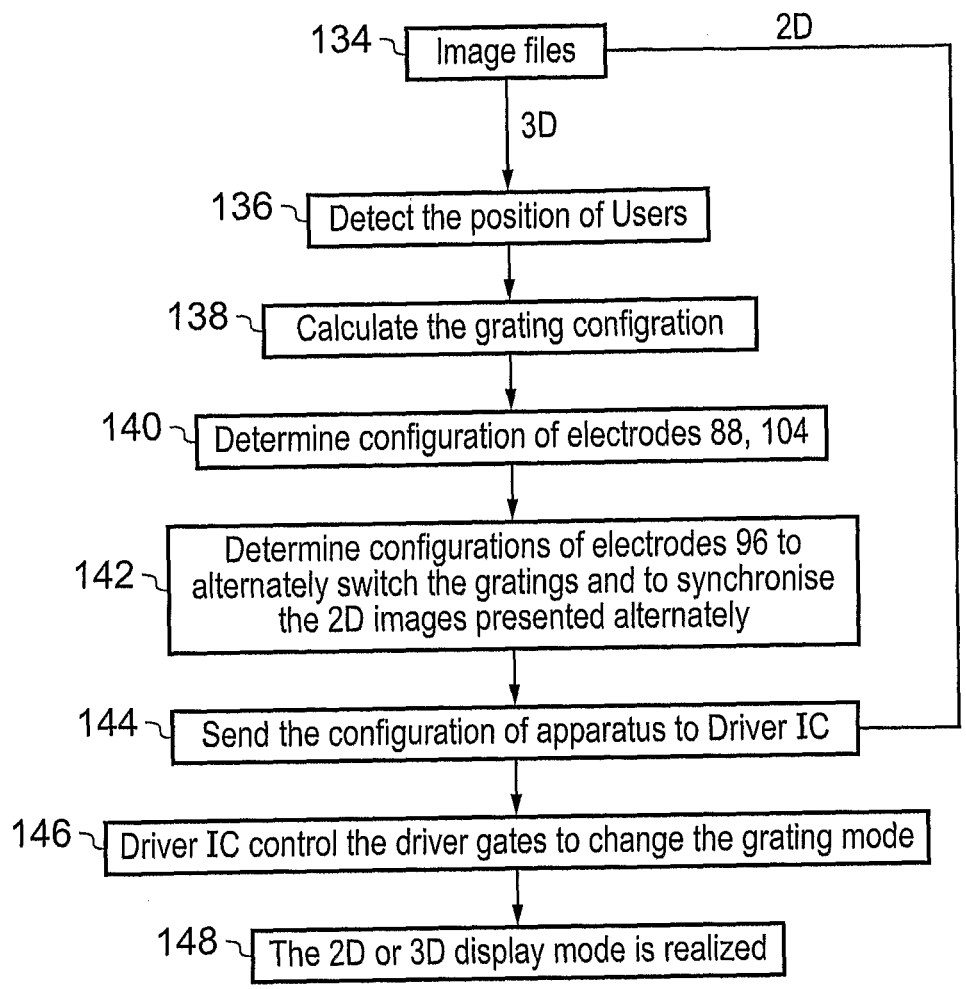
FIG. 18 illustrates a flow diagram of a method of detecting a position of a user and of controlling the orientation of a viewing angle range of an apparatus using the detected position.

The operation of the apparatus 24 illustrated in FIG. 17 is described in the following paragraphs with reference to FIGS. 18, 19A and 19B. At block 134, the controller 12 reads one or more image files from the memory 14 and determines whether they are for two dimensional display or whether they are stereoscopic images and are for three dimensional display.

If the images are for three dimensional display, the method moves to block 136 and the detector 25 detects the position of a user as described above and in particular, the distance and angle from the display 22 to the user's eyes. Where the detector 25 determines that there is more than one person present in front of the display 22, the controller 12 may determine which person is the main user of the device 10 and to which the three dimensional images should be directed to. In one example, the controller 12 may select the person who has the largest area triangle formed between their eyes and their mouth.

At block 138, the controller 12 calculates a grating configuration for directing the stereoscopic image to an eye of the user. Alternatively, the controller 12 may access a look up table stored in the memory 14 and obtain a grating configuration for a particular distance and angle.

At block 140, the controller 12 determines the configuration of the first plurality of transparent electrodes 88 and the third plurality of transparent electrodes 104 using the grating configuration calculated in block 138. For example, the controller 12 may access a look up table stored in the memory 14 to obtain electrode configuration data that is associated with different grating configurations.

At block 142, the controller 12 determines the configurations for the second plurality of electrodes 96 so that the gratings formed in the second liquid crystal layer 98 may be switched to provide light in two different directions. The controller 12 also determines the synchronization for the stereoscopic images so that the right eye image is displayed on the display 22 while the apparatus 24 is in a 'right eye' configuration and so that the left eye image is displayed on the display 22 while the apparatus 24 is in a 'left eye' configuration.

At block 144, the controller 12 sends the configurations determined in blocks 140 and 142 to the driver integrated circuit 112. At block 146, the driver gates 133₁, 132₂ and 132₃ are controlled by the timing logic controller 66 of the driver integrated circuit 130 to control the electrodes 88, 96 and 104 to form the gratings calculated in block 136. The controller 12 also controls the display 22 to display the stereoscopic image (for example, a stereoscopic image for the right eye).

Some or all of blocks 134, 136, 140, 142, 144 and 146 are then repeated to provide a further stereoscopic image to the other eye of the user. This process may then be repeated so that stereoscopic images are alternately presented to the user's eyes at a refresh rate of one hundred and twenty hertz for example. Consequently, embodiments of the present invention provide a three dimensional display mode (block 128). If the user changes position, this movement is detected at block 136 and the gratings formed in the first, second and third liquid crystal layers 90, 98 and 106 are changed so that the images are correctly received at the user's eyes.

If the controller 12 determines that the images are two dimensional images at block 134, the method moves to block 144 and the controller 12 sends a control signal to the driver integrated circuit 130 that indicates that no gratings should be formed in the apparatus 24. In other embodiments, the controller 12 may send a configuration to the driver integrated circuit 112 so that one or more of the transparent electrode layers 88, 96 or 104 form a grating for changing the angular viewing range of the apparatus 24 as described above with reference to FIGS. 2A, 2B for example.

Figure 19A:
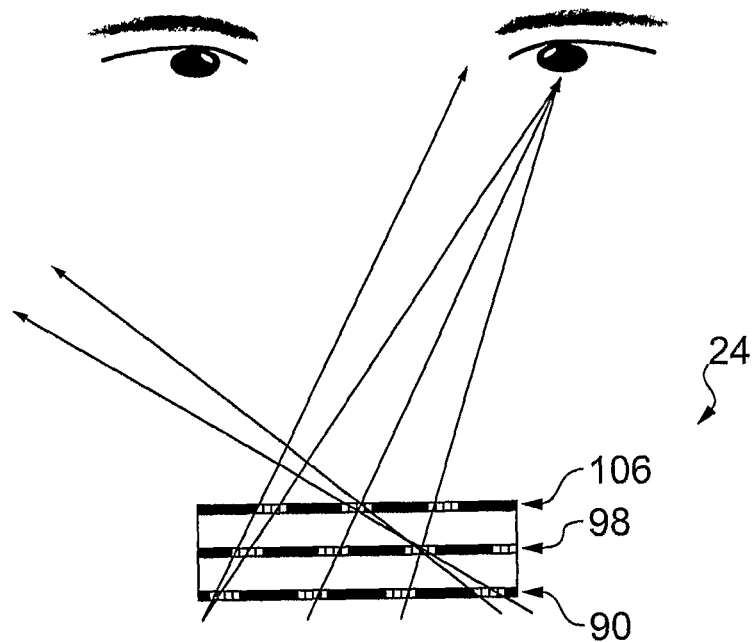
FIG. 19A illustrates a schematic cross sectional diagram of the apparatus illustrated in FIG. 17 having an angular viewing range directed at a user's left eye prior to movement of the user.

FIG. 19A illustrates a schematic cross sectional diagram of the apparatus 24 illustrated in FIG. 17 having an angular viewing range directed at a user's left eye prior to movement of the user. In this figure, the user is positioned relatively centrally with the display 22. The first, second and third liquid crystal layers 90, 98 and 106 each include a plurality of opaque and transparent regions that allow light from the display 22 to be received at the user's left eye and that substantially prevent light from the display 22 from being received at the user's right eye.

Figure 19B:
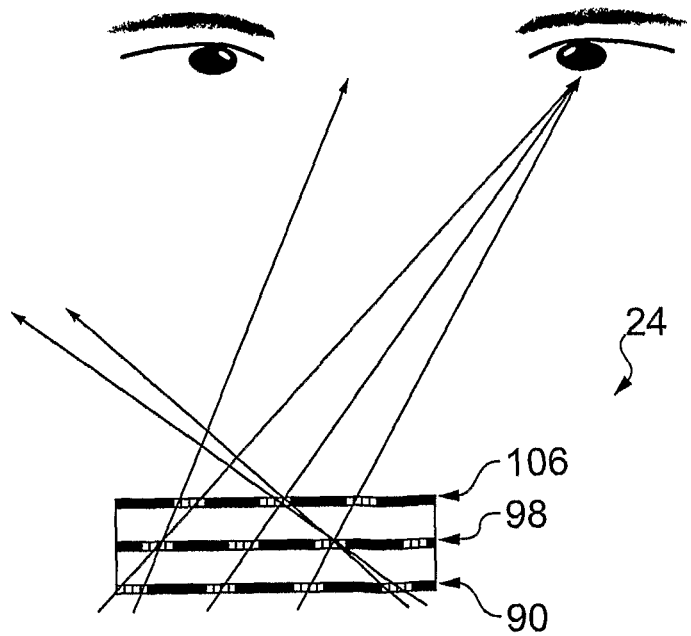
FIG. 19B illustrates a schematic cross sectional diagram of the apparatus illustrated in FIGS. 17 and 19A having an angular viewing range directed at a user's left eye after movement of the user.
Figure 20:
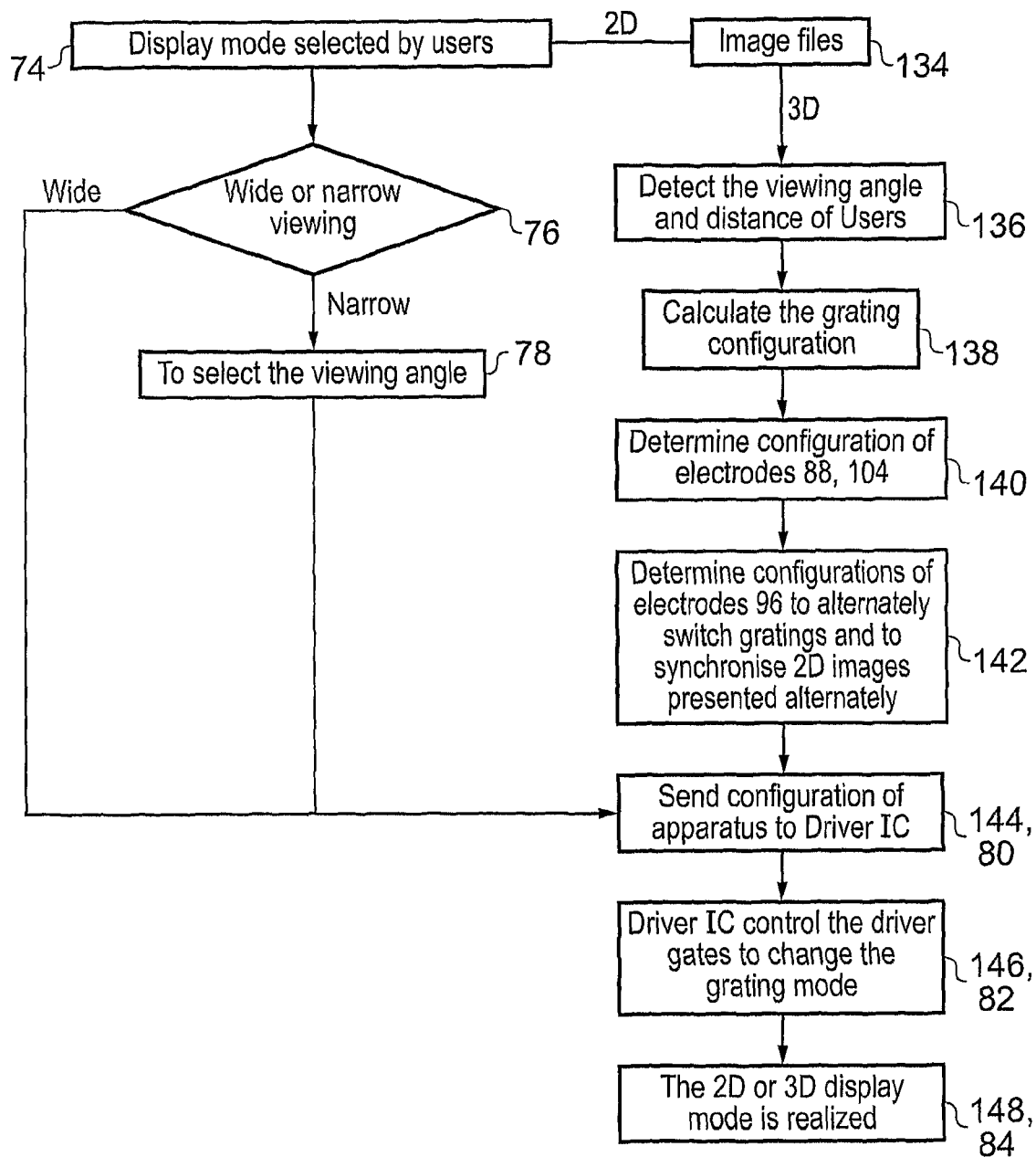
FIG. 20 illustrates a flow diagram of a method for enabling a user to select between a two dimensional mode and a three dimensional mode of an apparatus according to various embodiments of the invention.

FIG. 19B illustrates a schematic cross sectional diagram of the apparatus illustrated in FIGS. 17 and 19A having an angular viewing range directed at a user's left eye after movement of the user. In this figure, the user has moved laterally to his left relative to his position in FIG. 19A. The movement of the user has been detected by the detector 25 and consequently, the positioning of the transparent and opaque regions in the liquid crystal layers has been changed to take into account the new position of the user so that light is received at the user's left eye. In more detail, it can be seen that the transparent regions in the first liquid crystal layer 90 have been shifted to the left by two gratings relative to their positioning in FIG. 19A. It can also be seen that the transparent regions in the second liquid crystal layer 98 have been shifted to the left by one grating. The transparent regions in the third liquid crystal layer 106 have not been shifted.

The apparatus 24 illustrated in FIG. 17 may be configured to switch between providing a successively changeable two dimensional display (as described above with reference to FIGS. 2A, 2B, 3 and FIGS. 10A, 10B, 11) and providing a three dimensional display that is dependent upon the user's position (as described above with reference to FIGS. 17, 18, 19A and 19B). The method of operation of the apparatus is described in the following paragraphs with reference to FIG. 20.

At block 134, the controller 12 reads image files from the memory 14 and determines whether they are images for two dimensional display or whether they are stereoscopic images for three dimensional display. If the images are for two dimensional display, the method moves through blocks 76, 78, 80, 82 and 84 as described above with reference to FIG. 11. If the images are for three dimensional display, the method moves through blocks 136, 138, 140, 142, 144, 146 and 148 as described above with reference to FIG. 18.

The blocks illustrated in the FIGS. 3, 5, 11, 16, 18 and 20 may represent steps in a method and/or sections of code in the computer program 26. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. Apparatus comprising:
    a display comprising a plurality of pixels;
    a first liquid crystal layer configured to receive at least a portion of an image displayed by the display and to provide the portion of the image across an angular viewing range; and
    a first plurality of substantially transparent electrodes positioned adjacent the first liquid crystal layer, the first plurality of electrodes having a subset of more than two electrodes aligned with a pixel in the display, wherein the subset of transparent electrodes is configured to provide an electric field across the first liquid crystal layer to form a first plurality of transparent regions for the pixel and a first plurality of opaque regions for the pixel in the first liquid crystal layer in order to provide a first angular viewing range over which the pixel is viewable, and the subset of transparent electrodes is configured to provide an electric field across the first liquid crystal layer to form a second plurality of different transparent regions for the pixel and a second plurality of different opaque regions for the pixel in the first liquid crystal layer in order to provide a second angular viewing range over which the pixel is viewable, wherein the second angular viewing range is different from the first angular viewing range.

2. Apparatus as claimed in claim 1, wherein the second angular viewing range is greater than the first angular viewing range.

3. Apparatus as claimed in claim 1, wherein electrodes in the first plurality of electrodes are substantially elongate and have a length and a width, such that there are more than two electrodes per pixel in a width dimension.

4. Apparatus as claimed in claim 1, further comprising a controller configured to control the first plurality of electrodes.

5. Apparatus as claimed in claim 4, wherein the controller is configured to receive a control signal from a user input device including an indication of an angular viewing range, and to control the subset of the first plurality of electrodes to provide the indicated angular viewing range for the pixel.

6. Apparatus as claimed in claim 1, wherein the subset of the first plurality of transparent electrodes is configured to provide an electric field across the first liquid crystal layer to form a third plurality of transparent regions for the pixel and a third plurality of opaque regions in the first liquid crystal layer in order to provide an angular viewing range oriented in a first direction for the pixel, and the subset of transparent electrodes is configured to provide an electric field across the first liquid crystal layer to form a fourth plurality of different transparent regions for the pixel and a fourth plurality of different opaque regions for the pixel in the first liquid crystal layer in order to provide an angular viewing range oriented in a second direction for the pixel, the first direction being different from the second direction.

7. Apparatus as claimed in claim 6, wherein the controller is configured to control the pixel to provide a portion of a first image to the first liquid crystal layer when the angular viewing range for the pixel is orientated in the first direction, and to provide a portion of a second different image to the first liquid crystal layer when the angular viewing range for the pixel is orientated in the second direction.

8. Apparatus as claimed in claim 6, further comprising a detector configured to detect the position of a user's eyes relative to the apparatus, the controller being configured to process data from the detector to control the first plurality of electrodes so that the first liquid crystal layer provides an angular viewing range oriented towards a first eye of the user for at least a portion of a first image and provides an angular viewing range oriented towards a second different eye of the user for at least a portion of a second image.

9. Apparatus as claimed in claim 6, wherein the controller is configured to receive data including an indication that two dimensional display or three dimensional display is to be provided from the display, and to control the first plurality of transparent electrodes in dependence on the data.

10. A device comprising an apparatus as claimed in claim 1.

11. The apparatus as claimed in claim 1, wherein the subset of transparent electrodes are configured to cause there to be no opaque regions aligned with the pixel in the liquid crystal layer, in order to provide a maximum viewing range over which the pixel is viewable, the maximum angular viewing range being greater than the first angular viewing range and the second angular viewing range.

12. A method comprising:
    causing a subset of a first plurality of transparent electrodes, positioned adjacent a first liquid crystal layer and having more than two electrodes aligned with a pixel in a display, to provide an electric field across the first liquid crystal layer to form a first plurality of transparent regions for the pixel and a first plurality of opaque regions for the pixel in the first liquid crystal layer in order to provide a first angular viewing range over which the pixel is viewable; and
    causing the subset of the first plurality of transparent electrodes to provide an electric field across the first liquid crystal layer to form a second plurality of different transparent regions for the pixel and a second plurality of different opaque regions for the pixel in the first liquid crystal layer in order to provide a second angular viewing range over which the pixel is viewable, wherein the second angular viewing range is different from the first angular viewing range.

13. A method as claimed in claim 12, wherein the second angular viewing range is greater than the first angular viewing range.

14. A method as claimed in claim 12, wherein the electrodes in the first plurality of electrodes are substantially elongate and have a length and a width, such that there are more than two electrodes per pixel in a width dimension.

15. A method as claimed in claim 12, further comprising receiving a control signal including an indication of an angular viewing range, and controlling the subset of the first plurality of electrodes to enter a configuration to provide the indicated angular viewing range for the pixel.

16. A method as claimed in claim 12, further comprising causing the subset of the first plurality of transparent electrodes to provide an electric field across the first liquid crystal layer to form a third plurality of transparent regions for the pixel and a third plurality of opaque regions for the pixel in the first liquid crystal layer in order to provide an angular viewing range oriented in a first direction for the pixel, and causing the subset of the first plurality of transparent electrodes to provide an electric field across the first liquid crystal layer to form a fourth plurality of different transparent regions for the pixel and a fourth plurality of different opaque regions for the pixel in the first liquid crystal layer in order to provide an angular viewing range oriented in a second direction, the first direction being different from the second direction.

17. The method as claimed in claim 12, further comprising:
    causing there to be no opaque regions aligned with the pixel in the liquid crystal layer, in order to provide a maximum viewing range over which the pixel is viewable, the maximum angular viewing range being greater than the first angular viewing range and the second angular viewing range.

18. A non-transitory computer readable storage medium encoded with instructions that, when executed by a processor, cause:
    a subset of a first plurality of transparent electrodes, positioned adjacent a first liquid crystal layer and having more than two electrodes aligned with a pixel in a display, to provide an electric field across the first liquid crystal layer to form a first plurality of transparent regions for the pixel and a first plurality of opaque regions for the pixel in the first liquid crystal layer in order to provide a first angular viewing range over which the pixel is viewable; and
    the subset of the first plurality of transparent electrodes to provide an electric field across the first liquid crystal layer to form a second plurality of different transparent regions for the pixel and a second plurality of different opaque regions for the pixel in the first liquid crystal layer in order to provide a second angular viewing range over which the pixel is viewable, wherein the second angular viewing range is different from the first angular viewing range.

19. The non-transitory computer readable storage medium as claimed in claim 18, wherein the instructions, when executed by the processor, cause there to be no opaque regions aligned with the pixel in the liquid crystal layer, in order to provide a maximum viewing range over which the pixel is viewable, the maximum angular viewing range being greater than the first angular viewing range and the second angular viewing range.

* * * * *